(12) United States Patent
Regelskis

(10) Patent No.: US 11,079,545 B2
(45) Date of Patent: Aug. 3, 2021

(54) METHOD AND DEVICE FOR NON-RECIPROCAL TRANSMISSION OF ELECTROMAGNETIC RADIATION BEAM

(71) Applicant: UAB "ATŽALAS", Vilniaus (LT)

(72) Inventor: Kestutis Regelskis, Vilnius (LT)

(73) Assignee: UAB "ATZALAS", Vilniaus (LT)

( * ) Notice: Subject to any disclaimer, the term of this patent is extended or adjusted under 35 U.S.C. 154(b) by 43 days.

(21) Appl. No.: 16/495,068

(22) PCT Filed: Mar. 16, 2018

(86) PCT No.: PCT/IB2018/051761
§ 371 (c)(1),
(2) Date: Sep. 17, 2019

(87) PCT Pub. No.: WO2018/167720
PCT Pub. Date: Sep. 20, 2018

(65) Prior Publication Data
US 2020/0012048 A1    Jan. 9, 2020

(30) Foreign Application Priority Data
Mar. 17, 2017 (LT) .................................... 2017 502

(51) Int. Cl.
*G02B 6/27* (2006.01)
*G02B 6/293* (2006.01)

(52) U.S. Cl.
CPC ....... *G02B 6/2746* (2013.01); *G02B 6/29347* (2013.01)

(58) Field of Classification Search
CPC ........................... G02B 6/2746; G02B 6/29347
(Continued)

(56) References Cited

U.S. PATENT DOCUMENTS

| | | | |
|---|---|---|---|
| 3,484,151 A | 12/1969 | Turner | |
| 7,228,023 B1 | 6/2007 | Jones | |
| 2012/0236389 A1* | 9/2012 | Montoya | G02F 1/093 359/280 |

FOREIGN PATENT DOCUMENTS

| | | |
|---|---|---|
| EP | 1227359 A2 | 7/2002 |
| RU | 2601390 C1 | 11/2016 |
| WO | 2008048314 A2 | 4/2008 |

OTHER PUBLICATIONS

Kapitulnik et al. "High-resolution magneto-optic measurements with a Sagnac interfermeter (invited)", Journal of Applied Physics, vol. 75, No. 10; May 1994.
(Continued)

*Primary Examiner* — Jeremy M Blevins
(74) *Attorney, Agent, or Firm* — Brown & Michaels, PC

(57) ABSTRACT

An electromagnetic radiation beam is inputted into a ring interferometer rotating at the angular velocity Ω where the beam is split into two equally intensive counter—propagating electromagnetic beams. The Sagnac Effect results in the phase shift of ±Pi/2 radians, which may be either positive or negative depending on the direction in which the counter-propagating electromagnetic radiation beams propagate with regard to the rotation direction of the ring interferometer. An additionally phase shift of Pi/2 radians is induced between the counter-propagating electromagnetic radiation beams inside the ring interferometer results in a total phase shift of either Pi radians or 0. The counter-propagating electromagnetic radiation beams inside the ring interferometer are then combined into one single electromagnetic radiation (EMR) beam which outputted from the rotating ring interferometer by using a different path than the one through which the EMR beam is inputted into it.

25 Claims, 18 Drawing Sheets

(58) Field of Classification Search
USPC .......................................................... 385/3
See application file for complete search history.

(56) References Cited

OTHER PUBLICATIONS

International Search Report for PCT/IB2018/051761 dated Jun. 14, 2018.

* cited by examiner

METHOD AND DEVICE FOR NON-RECIPROCAL TRANSMISSION OF ELECTROMAGNETIC RADIATION BEAM

TECHNICAL FIELD TO WHICH INVENTION RELATES

The invention relates to the field of optical technology encompassing areas of terahertz, infrared, ultraviolet and extreme ultraviolet radiation technologies and is designed for the purpose of non-reciprocal transmission of electromagnetic radiation (EMR) beam method and device. It can be used where it is necessary to transmit the EMR beam forward by preventing reverse transmission. For example, non-reciprocal transmission devices are used as isolators or valves permitting an EMR beam to propagate in one direction only and the EMR beam propagating in the reverse direction is either blocked or diverted to a beam trap and never reaches the isolator entrance. Three- or four-port devices are used as circulators. For example, a three-port circulator directs an EMR beam from the first port to the second port and from the second port to the third port. Circulators are used in various laser amplification schemes, pulse stretching and compression schemes, and other applications where the reverse EMR beam needs to be directed to a different path than the forward propagating EMR beam.

RELEVANT PRIOR ART

Most devices developed for non-reciprocal transmission of EMR beams are based on the Faraday effect, where EMR beams propagating in forward and reverse directions pass through a transparent medium and the orientation of polarization of the beam is changed with the help of an external magnetic field. As a result of the Faraday effect the orientation of polarization of the EMR beam is changed in the predefined direction irrespective of the direction in which the EMR beam is propagating. The rotation angles of EMR beams propagating in forward and backward directions are summed up rather than compensated as usual, because the change in the orientation of polarization is only defined in terms of direction of the magnetic field and value of the Verdet constant.

There is a known method and device of non-reciprocal light transmission the operation of which is based on the Faraday effect. The device consists of a polarizer, a magneto-optical crystal placed in a magnet system and an analyzer, which are all arranged along the optical axis. The magneto-optical crystal is made of monocrystalline terbium-scandium-aluminium garnet. The exceptional qualities of the magneto-optical crystal enable the isolator to withstand radiation of average power measured even in kilowatts. The known method and device are described in the Russian Federation patent application RU2601390C1, 2015.

The disadvantage of this known method and device is that the isolator remains functional only within a certain range limited by the wavelength, because the magneto-optical crystal remains transparent only to certain wavelengths. Moreover, the Verdet constant that defines the polarization rotation angle depending on the magnetic field is not big enough for just any wavelength to enable its use in practical applications. In addition, the magneto-optical crystal absorbs optical radiation. As a result, the crystal is heated up and a thermal lens forms thus distorting the light beam. Moreover, the price of the magneto-optical crystal is relatively high.

There is a known method and device of non-reciprocal light transmission where non-reciprocal light transmission is ensured with the help of rotating half-wave plates. The device consists of two half-wave plates placed within the distance L from each other and rotating at the angular velocity $\omega$. In addition, the fast axis of the second half-wave plate is rotated to form the angle of Pi/8 radians with the first half-wave plate. While the linearly polarized light beam is travelling from the first half-wave plate to the second half-wave plate, the second plate rotates to form the angle of Pi/8 radians. Since the fast axis of the second half-wave plate has been rotated in advance to form the angle of Pi/8 radians with the first half-wave plate, the total rotation angle of the plate is Pi/4 radians. A half-wave plate efficiently rotates the polarization of light at an angle which is twice as large. Therefore, the polarization of light after the second half-wave plate will be rotated at the angle of Pi/2 radians. That is, the polarization of light at the output plane will be perpendicular to the polarization of light at the input plane of the device. The polarization of light propagating in backward direction is not rotated, because within the time it takes the light beam to travel from the second half-wave plate to the first half-wave plate, the fast axis of the first half-wave plate rotates by the same angle as that of the fast axis of the second half-wave plate. For example, in a situation where two half-wave plates are placed within the distance L=1 m from each other, for the half-wave plates to rotate at the required angle of Pi/8 radians they have to rotate at the speed of $\omega = Pi/8 * c/L = 75 * Pi/2 * 10^6$ radians per second or 18.75 million rotations per second. Here the speed of light $c = 3 * 10^8$ m/s. Clearly this is almost impossible to embody. Yet another way to improve the device is to use electrically controlled electro-optical crystals instead of the rotating half-wave plates. The known method and device are described in the U.S. Pat. No. 3,484,151A, 1969.

The disadvantage of this known method and device is that it is practically impossible to produce a device with mechanically controlled half-wave plates while an electrically controlled device with electro-optical crystals is a very complex and impractical solution. Moreover, despite the fact that electro-optical crystals can have fast controls they are not suitable for high-frequency switching, because they easily get overheated. In addition, the electro-optical crystals used to produce the device are expensive.

There is a known method and device of non-reciprocal light transmission where non-reciprocal light transmission is ensured with the help of the Mach-Zehnder interferometer. In this case optical modulators located in the two branches of the interferometer are used to induce counter-propagating waves that create the phase difference of Pi radians. As a result, there is a constructive interference of the light beams propagating in forward direction and a destructive interference of the light beams propagating in backward direction in the two branches of the interferometer. The Mach-Zehnder interferometer is made by using semiconductor materials therefore it is perfectly suitable for use in integrated schemes. The known method and device are described in the U.S. Pat. No. 7,228,023B1, 2007 and the international patent application WO2008/048314A2, 2008.

The disadvantage of this known method and device is that it is suitable only for use in integrated schemes and only under low average radiation power. It is rather complicated to produce the isolator of the kind suitable for use under high average radiation power. In addition, this device requires a generator which drives optical modulators.

Another disadvantage of this known method and device is that it is based on the Mach-Zehnder interferometer which makes it necessary to ensure that the optical path length be equal along both branches of the interferometer and do it at a much greater accuracy than when determining the length of the radiation wave and make sure that it does not change with time.

There is a known method and device of non-reciprocal light transmission that is based on the Mach-Zehnder interferometer with a non-reciprocal phase shift element installed between the input and output beam splitters (couplers). In the input beam splitter a light beam is split into two equal parts which are then transmitted along two different branches of the interferometer where they undergo different phase shifts depending on the direction in which the light beam propagates. In the output beam splitter the two light beams transmitted along two different branches of the interferometer are recombined and the resulting beam is then directed to the output port depending on the difference in the resulting phase shifts. The non-reciprocal phase shift element induces a 0 degree phase shift in forward direction and a 180 degree phase shift in backward direction. The non-reciprocal phase shift element is based on magneto-optical material; moreover, the non-reciprocal phase shift element can consist of a Faraday rotator and a half-wave plate. The known method and device are described in the European Community patent application EP1227359A2, 2002.

The disadvantage of this known method and device is that the magneto-optical material used for the purpose of the device remains transparent only within a limited wavelength range. Therefore, the chemical composition and the crystal structure of the magneto-optical material need to vary depending on the wavelength of EMR. Moreover, in case of some wavelengths the Verdet constant, which defines the rotation angle of polarization depending on the magnetic field, is simply not big enough. In addition, the magneto-optical material absorbs radiation. As a result, the magneto-optical material is heated up and a thermal lens forms thus distorting the radiation beam. Moreover, the price of the magneto-optical material is relatively high.

Another disadvantage of this known method and device is that it is based on the Mach-Zehnder interferometer which makes it necessary to ensure that the optical path length be equal along both branches of the interferometer and do it at a much greater accuracy than when determining the length of the radiation wave and make sure that it does not change with time. This is rather complicated to ensure in case of non-integrated Mach-Zehnder interferometers, therefore, it is complicated to create a powerful non-reciprocal transmission device by using this method.

Technical Problem to be Solved

The aim of this invention is to simplify the design of the device, to reduce the cost price of the device, to improve the reliability and resistance of the device to external-environmental disturbances, to simplify the applicability of the method and the device for a pre-defined wavelength of electromagnetic radiation and increase the permissible average electromagnetic radiation power and pulse energy.

Disclosure of Invention

In order to solve the problem according to a proposed method for non-reciprocal transmission of electromagnetic radiation (EMR) beam intended to transmit the EMR beam forward and prevent reverse transmission by directing the forward and reverse propagating EMR beams along different paths, the method comprises the following steps:

inputting the EMR beam through any preselected path of input/output paths into a rotating ring interferometer, which rotates at the angular velocity $\Omega$;

splitting the EMR beam inside the rotating ring interferometer into two equally or nearly equally intensive counter-propagating EMR beams travelling along counter-paths and inside the interferometer and because of the Sagnac Effect the phase shift of $\pm Pi/2 + m*Pi$ radians, where m is any integer number, is induced between two split counter-propagating EMR beams, which may be either positive or negative, with respect to the phase shift $m*Pi$ radians, depending on the direction in which the counter-propagating EMR beams travel along the counter-paths and with regard to the rotation direction of the rotating ring interferometer;

inducing an additional phase shift of $Pi/2 + n*Pi$ radians, where n is any integer number, between the counter-propagating EMR beams inside the ring interferometer, which is not dependent on the direction in which the counter-propagating EMR beams propagate and results in a total phase shift of either $Pi + (m+n)*Pi$ radians or $0 + (m+n)*Pi$ radians, between the counter-propagating EMR beams depending on the direction in which the counter-propagating EMR beams travel with regard to the rotation direction of the ring interferometer;

combining of the counter-propagating EMR beams inside the rotating ring interferometer into one single EMR beam and outputting the single EMR beam from the rotating ring interferometer through different input/output path selected from the paths than the one through which the EMR beam is inputted into the rotating ring interferometer; and aligning at least two input/output paths of EMR beams preselected of the input/output paths with the rotation axis of the rotating ring interferometer and directing to respective input/output ports.

Another embodiment of a proposed method for non-reciprocal transmission of electromagnetic radiation (EMR) beam intended to transmit the EMR beam forward and prevent reverse transmission by directing the forward and reverse propagating EMR beams along different paths is a method which comprises the following steps:

a) splitting the EMR beam travelling along any preselected path of input/output paths pair into two equally or nearly equally intensive EMR beams together with inducing the phase shift of $Pi/2 + n*Pi$ radians, where n is any integer number, between the split EMR beam;

b) inputting the split EMR beams into a rotating ring interferometer, which rotates at the angular velocity $\Omega$, and combining into two equally or nearly equally intensive counter-propagating EMR beams travelling along counter-paths and inside the rotating ring interferometer, and because of the Sagnac Effect the phase shift of $\pm Pi/2 + m*Pi$ radians, where m is any integer number, is induced between two counter-propagating EMR beams, which may be either positive or negative, with respect to the phase shift $m*Pi$ radians, depending on the direction in which the counter-propagating EMR beams travel along the counter-paths (6) and with regard to the rotation direction of the rotating ring interferometer and results in a total phase shift of either $Pi + (m+n)*Pi$ radians or $0 + (m+n)*Pi$ radians between the counter-propagating EMR beams;

c) combining of the counter-propagating EMR beams inside the rotating ring interferometer into one single EMR beam and outputting from the rotating ring interferometer through input/output path selected from the different paths pair or than the one through which the EMR beam is inputted into the rotating ring interferometer;

or a) inputting the EMR beam travelling along any preselected path of input/output paths pair into a rotating ring interferometer, which rotates at the angular velocity $\Omega$, and splitting into two equally or nearly equally intensive counter-propagating EMR beams travelling along counter-paths and inside the rotating ring interferometer and because of the Sagnac Effect the phase shift of $\pm Pi/2 + m*Pi$ radians, where m is any integer number, is induced between two counter-propagating EMR beams, which may be either positive or negative, with respect to the phase shift $m*Pi$ radians, depending on the direction in which the counter-propagating EMR beams travel along the counter-paths and with regard to the rotation direction of the rotating ring interferometer;

b) combining of the counter-propagating EMR beams inside the rotating ring interferometer into two EMR beams and outputting from the rotating ring interferometer;

c) inducing the phase shift of $Pi/2 + n*Pi$ radians between outputted from the rotating ring interferometer EMR beams, what results in a total phase shift of either $Pi+(m+n)*Pi$ radians or $0+(m+n)*Pi$ radians between the EMR beam, together with combining into one single EMR beam and directing forward along input/output path selected from the different paths pair than the one through which the EMR beam is inputted into the rotating ring interferometer; and d) aligning at least one input/output path of EMR beams preselected of input/output path pair and at least one input/output path of EMR beams preselected of remained input/output path pair with the rotation axis of the rotating ring interferometer and directing to respective input/output ports.

The EMR beam can be inputted and outputted thought the respective input/output ports so that if the EMR beam is inputted through the first input/output port, it will be outputted through the second input/output port or removed, if the EMR beam is inputted through the second input/output port, it will be outputted through the third input/output port or removed, if the EMR beam is inputted through the third input/output port, it will be outputted through the fourth input/output port or removed, and if the EMR beam is inputted through the fourth input/output port, it will be outputted through the first input/output port or removed.

As embodiment of the present invention is proposed a device for non-reciprocal transmission of EMR beam intended to transmit the electromagnetic radiation beam forward and prevent reverse transmission and equipped with at least two input/output ports for inputting the EMR beam into the device and outputting from the device, wherein the device comprises:

a beam splitter intended to split the EMR beam, which is inputted into the rotating ring interferometer and later to combine separated said EMR beams into a single EMR beam before it is outputted from the rotating ring interferometer, wherein the beam splitter splits the EMR beam, which is inputted into the rotating ring interferometer, into two equally or nearly equally intensive counter-propagating EMR beams, travelling along counter-paths inside the rotating ring interferometer and because of the Sagnac Effect a phase shift of $\pm Pi/2 + m*Pi$ radians, where m is any integer number, is induced, which may be either positive or negative with respect to the phase shift $m*Pi$ radians, depending on the direction in which the counter-propagating EMR beams propagate with regard to the rotation direction of the ring interferometer, and a phase element for inducing an additional phase shift of $Pi/2 + n*Pi$ radians, where n is any integer number, between the counter-propagating EMR beams inside the rotating ring interferometer, which is not dependent on the direction in which the counter-propagating EMR beams propagate with regard to the rotation direction of the rotating ring interferometer and results in a total phase shift of either $Pi+(m+n)*Pi$ radians or $0+(m+n)*Pi$ radians between the counter-propagating EMR beams travelling along counter paths, which are then directed to the beam splitter and combined into one single EMR beam which is outputted from the rotating ring interferometer through different input/output path selected from the paths than the one through which the EMR beam is inputted into the rotating ring interferometer;

EMR beam transmission circuit connecting at least two paths preselected of the input/output paths of the EMR beams intended to align the selected paths with the rotation axis of the rotating ring interferometer and to direct them to respective input/output ports.

Another embodiment of a device for non-reciprocal transmission of electromagnetic radiation (EMR) beam intended to transmit the EMR beam forward and prevent reverse transmission and equipped with at least two input/output ports for inputting the EMR beam into the device and outputting from the device, wherein the device comprises:

a rotating ring interferometer comprising: a beam splitter intended to split the one EMR beam or to combine-mix two EMR beams, which is/are inputted in the rotating ring interferometer, into two equally or nearly equally intensive counter-propagating EMR beams, travelling along counter-paths and inside the rotating ring interferometer and because of the Sagnac Effect a phase shift of $\pm Pi/2 + m*Pi$ radians, where m is any integer number, is induced between two counter-propagating EMR beams, which may be either positive or negative, with respect to the phase shift $m*Pi$ radians, depending on the direction in which the counter-propagating EMR beams propagate with regard to the rotation direction of the ring interferometer, and to combine counter-propagating EMR beams into two EMR beams or one EMR beam, which are/is outputted from the rotating ring interferometer;

a phase element, which is placed on the preselected path of input/output paths pair, intended for splitting the EMR beam travelling along any preselected path together with inducing the phase shift of $Pi/2 + n*Pi$ radians, where n is any integer number, between the split EMR beams, which are inputted to the rotating ring interferometer and results in a total phase shift of either $Pi+(m+n)*Pi$ radians or $0+(m+n)*Pi$ radians between the counter-propagating EMR beams travelling along counter paths and outputted from the rotating ring interferometer through input/output path selected from the different paths pair than the one through which the EMR beam is inputted into the rotating ring interferometer; or the phase element is placed/arranged on the preselected path of input/output paths pair for inducing the phase shift of $Pi/2 + n*Pi$ radians between outputted from the rotating ring interferometer EMR beams, what results in a total phase shift of either $Pi+(m+n)*Pi$ radians or $0+(m+n)*Pi$ radians between the EMR beam, together with combining into one single EMR beam and directing forward along input/output path selected from the different paths pair than the one through which the EMR beam is inputted into the rotating ring interferometer; and EMR beam transmission circuit for connecting and aligning at least one input/output path of EMR beams preselected of input/output path pair and at least one input/output path of EMR beams preselected of remained input/output path pair with the rotation axis of the rotating ring interferometer and directing to respective input/output ports.

A additional beam splitter is provided, which in combination with phase element are placed on the preselected path of input/output paths pair, intended for splitting the EMR beam travelling along any preselected path together with inducing the phase shift of Pi/2+n*Pi radians, or a beam splitter in combination with phase element are placed on the preselected path of input/output paths pair, intended for inducing the phase shift of Pi/2+n*Pi radians between outputted from the rotating ring interferometer EMR beams together with combining into one single EMR beam.

The rotating ring interferometer, comprising the EMR beam splitter and optionally the phase element for inducing an additional phase shift of Pi/2+n*Pi radians, where n is any integer number, further comprises at least two reflectors arranged inside the interferometer on the counter paths of the counter-propagating EMR beams, and the EMR beam transmission circuit connecting the rotating ring interferometer with respective input/output ports of the device comprises a reflector arranged coaxially with the rotation axis of the rotating ring interferometer and there may be provided plurality of additional mirrors in order to align at least two input/output paths of EMR beams with the rotation axis of the ring interferometer, wherein the reflector and the additional mirrors are arranged to rotate together with the rotating ring interferometer.

The rotating ring interferometer comprises a mean intended to change the state of polarization to the orthogonal state of the counter-propagating beams travelling along paths inside the rotating ring interferometer, where the said mean may take the shape of a half-wave plate.

Additional means can be provided that rotate together with the ring interferometer and are intended to transform the linearly or elliptically polarized EMR beam into the circularly polarized EMR beam that propagates between the rotating part of the device and the input/output ports of the device, furthermore, there can be additional means provided that do not rotate together with the ring interferometer and are intended to transform the circularly polarized EMR beam on the side of the rotating ring interferometer to the linearly polarized EMR beam on the side of input/output ports of the device and polarizing beam splitters in order to ensure the spatial separation of the orthogonally polarized EMR beams that propagate along geometrically overlapping paths and to direct them to separate input and output ports of the device.

The rotating ring interferometer is a fibre ring interferometer, which comprises:
   the beam splitter and two polarization-maintaining fibers, which are crosswise spliced to each other—at one point in which slow and fast axis of the fibers are crossed;
   the phase element for inducing an additional phase shift is formed by choosing the length of the fibres, which differ in ¼+n/2 polarization beat length, where n is any integer number, between the slow and the fast polarization axis of the fibers;
   EMR beam transmission circuit connecting the rotating ring interferometer with respective input/output ports of the device comprises at least one collimator arranged coaxially with the rotation axis of the rotating interferometer and the collimators are connected to the fibre ring interferometer by polarization-maintaining fibers.

Device can be provided with additional means for rotating the polarization of EMR intended to synchronically rotate the polarization of EMR together with the rotating ring interferometer and at the same time to maintain the orientation of the EMR beam polarization irrespective of the rotation angle of the rotating ring interferometer, further there are can be provided additional polarizing beam splitters in order to ensure the spatial separation of the orthogonally polarized EMR beams that propagate along geometrically overlapping paths, and to direct them to separate input and output ports of the device.

The additional means to rotate the polarization of EMR may be a rotating half-wave plate or liquid-crystal polarization rotator, or reflective polarization rotator, or polarizing prism rotator or any other means capable of rotating the polarization in synchrony with the rotating ring interferometer.

The rotating ring interferometer comprises an opening formed coaxially with the axis of the rotating ring interferometer, wherein the EMR beam propagates through the opening between the ports of the device and the rotating ring interferometer.

Fiber pigtails can be connected to any of the ports of the device.

Advantages of the Invention

One advantage of the proposed invention is that the rotating ring interferometer on which the device is based unlike other types of interferometers, such as the Mach-Zehnder interferometer, is not sensitive to shifts of reflectors, beam splitter or other elements of the device, because counter-propagating EMR beams propagate along the paths which co-exist near one another, thus the beams travel the same distance. This makes it easy to ensure the required phase difference between the counter-propagating EMR beams in case of large-scale ring interferometers, for example, one meter in diameter. In addition, the rotating ring interferometer is not sensitive to environmental disturbances, vibration or temperature fluctuations. A ring interferometer is easy to tune.

Another advantage is that the physical dimensions and the rotation velocity of the ring interferometer on which the device is based are perfectly suitable for its practical application. The Sagnac effect results in a phase shift between the counter-propagating EMR beams of $$\Delta\varphi \approx \frac{8\pi S\Omega}{\lambda c},$$

where S is the enclosed area limited by the ring interferometer, $\lambda$ is the wavelength, $\Omega$ is the rotation velocity of the ring interferometer, and c is the speed of light. If EMR beam travels around the ring interferometer several times in a sequence, the enclosed area limited by the ring interferometer will effectively be larger by the same number of times. With the aim to ensure non-reciprocal transmission of EMR beam, the phase difference resulting from the Sagnac effect must be Pi/2 radians. For example, if the ring interferometer is round in shape with the radius of 10 cm and the wavelength of 1064 nanometres, the rotation velocity of the interferometer must be 635 radians per second or 101 rotations per second. All of this is easy to achieve in practice.

Moreover, the phase shift of ±Pi/2 radians induced by the Sagnac effect can also be repetitive by Pi, i.e., ±Pi/2+m*Pi radians, where m is any integer number. Another advantage is that the device can be easily produced to accommodate any wavelength, starting with terahertz and going down to extreme ultraviolet radiation, because the key components of the device are reflectors and a beam splitter, which can be either of a polarizing or a non-polarizing type.

In addition, the device may be produced suitable for both polarized and non-polarized electromagnetic radiation. The device made suitable for non-polarized optical radiation may be used to protect pump diode lasers from laser radiation, when the spectrum of the radiation generated by the laser overlaps with that of the diode laser.

Another advantage is that the rotation of a ring interferometer can be ensured with the help of an electric motor, compressed air turbine or any other engine.

Another advantage is that the device can be adapted for very high average electromagnetic radiation power, because it is made only of reflectors, a beam splitter and a phase element without any magneto-optical crystals or any other material that would strongly absorb electromagnetic radiation. The highest permissible radiation power depends on the resistance of the beam splitter, reflectors and the phase element to radiation.

In addition, the device can be easily produced to accommodate a large aperture for non-reciprocal transmission of EMR beams, because the aperture of the device depends on the aperture of its components, i.e. the aperture of reflectors and the beam splitter. The aperture is mainly limited by the rotation axis of the ring interferometer of the device wherein the aperture is formed to feed EMR beams in and out of the ring interferometer. Axes with apertures of several centimetres in diameter can easily be produced. In addition, a two-branch device, e.g. an isolator, can be embodied without an aperture in the rotation axis by directing the orthogonally polarized beams in the same direction and by installing an engine on the other side of the device to rotate the ring interferometer.

Moreover, the cost price of the device is lower compared to other analogous devices with the same parameters, because no magneto-optical crystals are used to produce it.

Another advantage is that the design of the device is extremely simple and the device requires little maintenance. It can be produced of standard, commercially accessible optical components, i.e. reflectors and beam splitters.

Another advantage is that the device contains no magnets, therefore, there is no need to take any special safety measures when working with the device produced based on the proposed invention.

More detailed description of the invention is given in the following drawings which does not limit the scope of the present invention:

EXAMPLES OF EMBODIMENT OF THE INVENTION

Figure 1A:
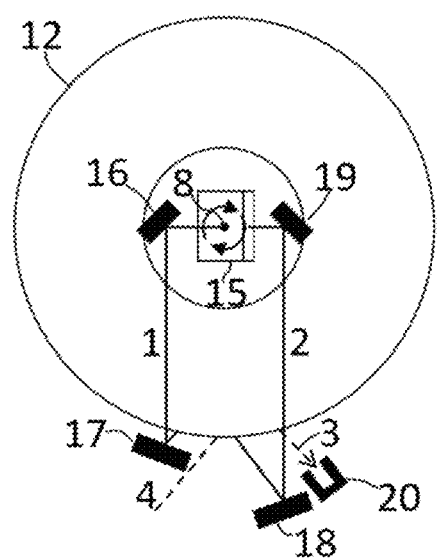
FIG. 1a is a scheme of the proposed device for non-reciprocal transmission of EMR beam with two ports and a rotating ring interferometer independent of polarization (top view)

The propagation/transmission/input/output path of EMR beam defines the direction in which the EMR beam propagates, its position in space and state of polarization. Even though geometrically EMR beams can overlap, orthogonally polarized EMR beams have different propagation/transmission/input/output paths, because orthogonally polarized beams can have different refraction indexes due to anisotropy of materials. Moreover, orthogonally polarized beams can be separated with the help of wave plates and a polarizing beam splitter and directed along different geometrical paths.

The proposed method for non-reciprocal transmission of EMR beam comprises the following steps: EMR beam by any preselected path of input/output paths (1, 2, 3, 4) is directed to a rotating ring interferometer 12, which rotates at the angular velocity Ω, where with the help of a beam splitter 5 it is split into two equally or nearly equally intensive counter-propagating EMR beams travelling along counter-paths 6 and 7 inside the rotating ring interferometer 12. The realization of the beam splitting into equally intensive beams depends on the technical possibility of the beam splitter. Because of the Sagnac effect the phase shift of ±Pi/2 radians is induced between the two counter-propagating EMR beams inside the rotating ring interferometer 12, which may be either positive or negative depending on the direction in which the counter-propagating EMR beams propagate with regard to a rotation direction of the ring interferometer 12. In addition, the phase element inside the rotating ring interferometer 12 induces an additional phase shift of Pi/2+n*Pi radians, where n is any integer number, between the counter-propagating EMR beams travelling along counter paths 6 and 7, which is not dependent on the direction in which the EMR beams propagate. Therefore, the total phase shift of either Pi+n*Pi radians or 0+n*Pi radians between the counter-propagating EMR beams is achieved depending on the direction in which the counter-propagating EMR beams propagate with regard to the rotation direction of the ring interferometer 12. As a result, the counter-propagating EMR beams along the counter paths 6, 7 are again combined into one single EMR beam inside the rotating ring interferometer 12 and outputted from it by using a different path from paths 1-4 than the one through which the EMR beam is inputted into it. The EMR beam can be inputted into the ring interferometer 12 and outputted from it by using four different paths 1-4 that are interconnected so that once the EMR beam is inputted into the rotating ring interferometer 12 through the first path 1 it will be directed along the second path 2, and if the EMR beam is inputted into the rotating ring interferometer 12 through the second path 2, it will be directed along the third path 3; if the EMR beam is inputted into the rotating ring interferometer 12 through the third path 3, it will be directed along the fourth path 4, and if the EMR beam is inputted into a rotating ring interferometer 12 through the fourth path 4, it will be directed along the first path 1. In addition, according to the method at least two input/output paths (1-4) of EMR beams are aligned with the rotation axis 8 of the rotating ring interferometer 12 and directed to respective input/output ports (21, 22, 23, 24).

Moreover, the phase element 11 which induces an additional phase shift of Pi/2+n*Pi radians (where n is any integer number) between the counter-propagating EMR beams travelling along counter paths 6 and 7, can be located outside the ring interferometer 12 and placed either on EMR beams input/output paths 2 and 4 or on input/output paths 1 and 3.

Figure 1B:
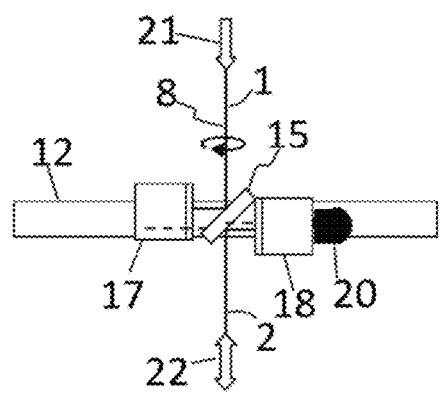
FIG. 1b is a scheme of the proposed device for non-reciprocal transmission of EMR beam with two ports and a rotating ring interferometer independent of polarization (side view)

The proposed device for non-reciprocal transmission of EMR beam wherein the non-reciprocal propagation of EMR beam is ensured inside a ring interferometer 12 rotating at the angular velocity Ω is shown in FIG. 1a and FIG. 1b. The scheme of the rotating ring interferometer 12 independent of polarization is separately shown in FIG. 4. The EMR beam inputted into the rotating ring interferometer 12 through path 1 and is outputted from the interferometer 12 through path 2, because the sum of the phase shifts resulting from the Sagnac effect and induced by the phase element 11 (see FIG. 4) is Pi radians, whereas the EMR beam inputted into the rotating ring interferometer 12 through the path 2 is outputted from the interferometer 12 through path 3, because the induced phase shifts compensate one another and their sum equals zero. There is a trap 20 arranged along path 3 to collect the EMR beam. The device is equipped with a circuit connecting the rotating ring interferometer 12 with two ports 21 and 22 of the device thus aligning the input/output paths 1 and 2 of EMR beams with the rotation axis 8 of the ring interferometer 12. The optical circuit consists of a reflector 15 arranged coaxially with the rotation axis 8 of the ring interferometer 12 and plurality of additional mirrors 16-19 for aligning the input/output paths 1 and 2 of EMR with the rotation axis 8 of the ring interferometer. The reflector 15 arranged coaxially with the rotation axis 8 of the ring interferometer and other additional mirrors 16-19 rotate together with the ring interferometer 12. The EMR beam that propagates from the input port 21 into the rotating ring interferometer 12 through path 1 is outputted through path 2 to the input/output port 22, whereas the EMR beam that propagates in the opposite direction from port 22 through path 2 towards the ring interferometer 12 is outputted from it through path 3 and gets into the trap 20. In this way the device performs the function of a two-port isolator or a valve wherein an EMR beam is permitted to propagate in one direction only and the EMR beam propagating in the reverse direction is blocked and diverted to the beam trap 20.

Figure 2A:
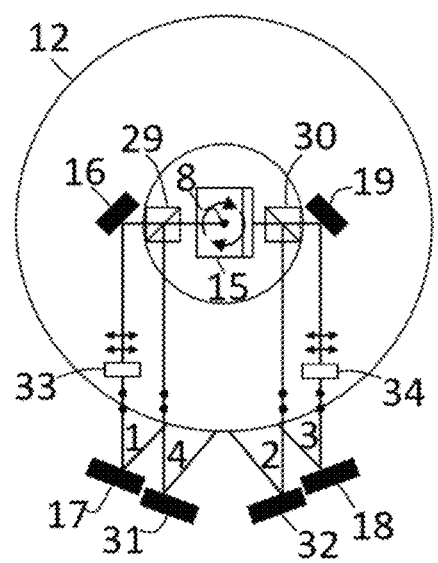
FIG. 2a is a scheme of the proposed polarization-maintaining device for non-reciprocal transmission of EMR beam with four ports including a rotating ring interferometer independent of polarization (top view)
Figure 2B:
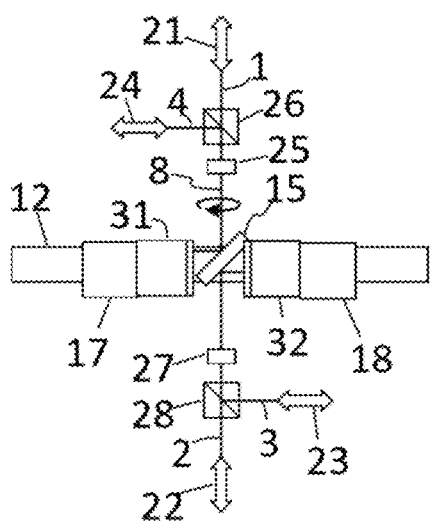
FIG. 2b is a scheme of the proposed polarization-maintaining device for non-reciprocal transmission of EMR beam with four ports including a rotating ring interferometer independent of polarization (side view)

FIG. 2a and FIG. 2b show another device for non-reciprocal transmission of EMR beam, which is similar to the device shown in FIG. 1a and FIG. 1b, but differs in that this device has a circuit connecting the rotating ring interferometer 12 with the four ports 21-24 of the device thus aligning paths 1-4 along which EMR beams propagate with the rotation axis 8 of the ring interferometer 12. The EMR beam transmission circuit is composed of a reflector 15 arranged coaxially with the rotation axis 8 of the interferometer 12, two polarizing beam splitters 29, 30 which help combine pairs of orthogonally polarized EMR beams that propagate along paths 1, 4 and 2, 3, and plurality of additional mirrors 16-19, 31, 32 that help align the paired input/output paths 1, 4 and 2, 3 of EMR beams with the rotation axis 8 of the ring interferometer 12. In addition, there are two half-wave plates 33, 34 which rotate the polarization plane of the EMR beams propagating along paths 1 and 3 by 90 degrees. The polarizing beam splitters 26 and 28 which do not rotate together with the ring interferometer 12 are used to separate the combined orthogonally polarized EMR beams that propagate in pairs along paths 1, 4 and 2, 3 and to direct them to respective input/output ports 21-24. In order to prevent the rotation of polarization of EMR beams in the rotating ring interferometer 12, means to rotate polarization 25, 27 have been installed and intended to rotate the polarization of the EMR beams that propagate in pairs along paths 1, 4 and 2, 3 in synchrony with the ring interferometer 12. The EMR beams propagating along paths 1-4 may be paired differently, too, e.g. 1, 2 and 3, 4, without even changing the design of the device. The ring interferometer 12 which is part of the device is independent of polarization, but the EMR beams that propagate inside the interferometer are polarized. In this particular case, the polarization shown in FIG. 2a is referred to as s-polarization (•). The device performs the function of a four-port circulator which is dependent on polarization, wherein the EMR beam is directed from port 21 to port 22, from port 22 to port 23, from port 23 to port 24, and from port 24 back to port 21.

Figure 3A:
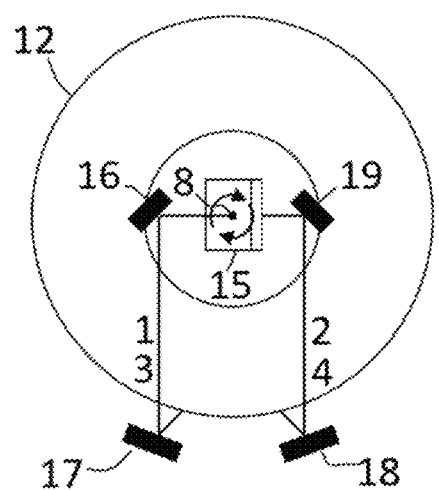
FIG. 3a is a scheme of the proposed device for non-reciprocal transmission of EMR beam with four ports and a rotating ring interferometer dependent on polarization (top view)
Figure 3B:
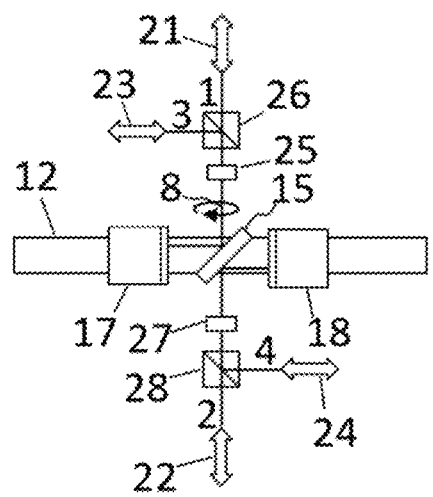
FIG. 3b is a scheme of the proposed device for non-reciprocal transmission of EMR beam with four ports and a rotating ring interferometer dependent on polarization (side view)

FIG. 3a and FIG. 3b show another device for non-reciprocal transmission of EMR beam, wherein the non-reciprocal transmission of EMR beam is ensured inside a ring interferometer 12 which is dependent on polarization and rotates at the angular velocity Ω. The scheme of a ring interferometer 12 dependent on polarization is shown separately in FIG. 5. The device includes a circuit connecting the rotating ring interferometer 12 with four ports 21-24 thus aligning paths 1-4 along which EMR beams propagate with the rotation axis 8 of the ring interferometer 12. The said optical circuit consists of a reflector 15 coaxially arranged along the rotation axis 8 of the ring interferometer 12 and several additional mirrors 16-19 that help align the input/output paths 1, 3 and 2, 4 with the rotation axis 8 of the ring interferometer. The input/output paths 1 and 3 and the input/output paths 2 and 4 geometrically overlap, but the EMR beams that propagate along the said overlapping paths are orthogonally polarized. The polarizing beam splitters 26 and 28 which do not rotate together with the rotating ring interferometer 12 are employed to separate the orthogonally polarized EMR beams that propagate in pairs along paths 1, 3 and 2, 4 and to direct them to respective input/output ports 21-24. In order to prevent the rotation of polarization of EMR beams in the rotating ring interferometer 12, means to rotate polarization 25, 27 have been installed and used to rotate the polarization of the EMR beams that propagate along the input/output paths 1, 3 and 2, 4 in synchrony with the ring interferometer. The device performs the function of a four-port circulator which is dependent on polarization, wherein EMR beam is directed from port 21 to port 22, from port 22 to port 23, from port 23 to port 24, and from port 24 back to port 21.

Figure 4A:
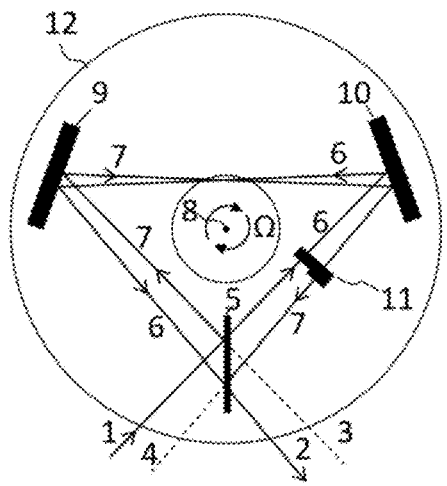
FIG. 4a is a scheme of a rotating ring interferometer independent of polarization, wherein EMR beam is fed in through path 1 and fed out through path 2.
Figure 4B:
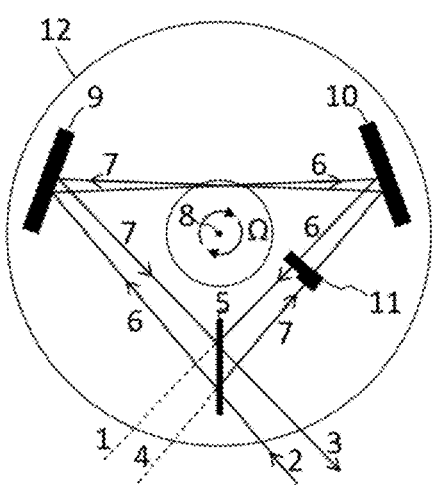
FIG. 4b is a scheme of a rotating ring interferometer independent of polarization, wherein EMR beam is fed in through path 2 and fed out through path 3.

FIG. 4a and FIG. 4b show a scheme of a rotating ring interferometer 12 independent of polarization. A rotating ring interferometer 12 independent of polarization consists of a beam splitter 5 which splits EMR beam into two equally or nearly equally intensive counter-propagating beams, at least two reflectors 9 and 10 and a phase element 11 which induces a phase shift of Pi/2 radians between the counter-propagating EMR beams. The counter-propagating EMR beams travel along paths 6 and 7 which are slightly geometrically separate from one another so that the said beams would travel in circle around the ring interferometer and then meet and interfere at a different place in the beam splitter (5) than they did initially. The ring interferometer 12 rotates around its axis 8 at the angular velocity Ω and the Sagnac effect results in the phase shift of ±Pi/2 radians between the two counter-propagating EMR beams travelling along paths 6 and 7, which may be either positive or negative depending on the direction in which the counter-propagating EMR beams propagate with regard to the rotation direction of the ring interferometer 12. FIG. 4a shows a situation wherein EMR beam is fed into a rotating ring interferometer through path 1 and is then split into two equally or nearly equally intensive EMR beams by a beam splitter 5. The EMR beam that travels straight through the beam splitter propagates further along path 6 in the direction which is opposite to that in which the ring interferometer 12 rotates, and the EMR beam that is reflected from the beam splitter 5 travels along path 7 in the direction in which the ring interferometer 12 rotates and the induced Sagnac effect results in the phase difference of Pi/2 radians between the two counter-propagating EMR beams. Moreover, the phase element 11 installed in the ring interferometer 12 induces an additional phase shift of Pi/2 radians resulting in a total phase shift of Pi radians between the counter-propagating EMR beams, and the said EMR beams travelling along paths 6 and 7 with the help of the beam splitter 5 are then combined into a single EMR beam which is fed out of the ring interferometer 12 through path 2. However, if the latter EMR beam is reverted and returned along the same path 2 back to the ring interferometer 12, it is then split with the help of the beam splitter 5 into two EMR beams, i.e. into a beam that is reflected from the beam splitter 5 and propagates along path 7 in the direction which is opposite to that in which the ring interferometer 12 rotates, and into a beam that passed straight through the beam splitter 5 and propagates along path 6 in the direction in which the ring interferometer rotates. The induced Sagnac effect results in the phase shift of minus Pi/2 radians between the two counter-propagating EMR beams, therefore, the additional phase shift of Pi/2 radians induced by the phase element 11 is compensated and the two EMR beams with the help of the beam splitter 5 are then combined into a single EMR beam which is fed out of the ring interferometer 12 through path 3 (FIG. 4*b*). Analogically, the EMR beam that is fed into the ring interferometer through path 3 is directed along path 4 and the EMR beam that is fed into the ring interferometer 12 through path 4 is directed along path 1. Schematically, the way the EMR beam travels can be represented as follows: 1→2→3→4→1, where the arrows indicate the path in which the EMR beam gets directed.

Figure 5A:
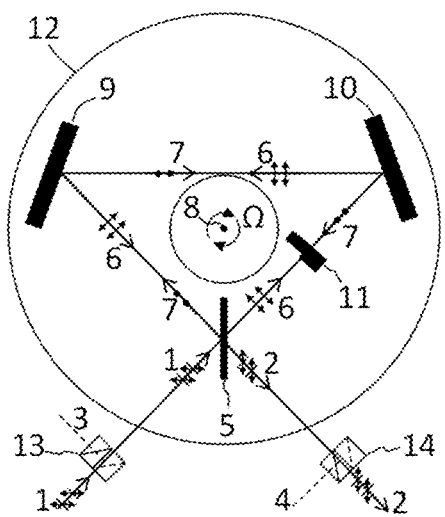
FIG. 5a is a scheme of a rotating ring interferometer dependent on polarization, wherein EMR beam is fed in through path 1 and fed out through path 2.
Figure 5B:
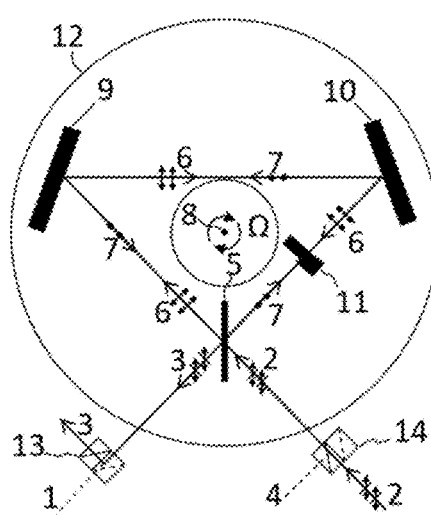
FIG. 5b is a scheme of a rotating ring interferometer dependent on polarization, wherein EMR beam is fed in through path 2 and fed out through path 3.

FIG. 5*a* and FIG. 5*b* show a scheme of a rotating ring interferometer 12 dependent on polarization. It is similar to the scheme presented in FIG. 4, but is different in that the ring interferometer 12 is dependent on polarization and it contains a polarizing beam splitter 5, its phase element 11 is also dependent on polarization, and paths 6 and 7 along which EMR beams propagate may geometrically overlap, because the said EMR beams are orthogonally polarized. Respectively, paths 1 and 3 and paths 2 and 4 of the EMR beams that are fed into and out of the ring interferometer may geometrically overlap too, because the said EMR beams are orthogonally polarized. For clarity reasons, FIG. 5 shows two polarizing beam splitters 13, 14 to demonstrate the way to separate two orthogonally polarized EMR beams that propagate along geometrically overlapping paths, that is, 1 from 3 and 2 from 4 respectively. The phase element 11 inside the ring interferometer 12 is dependent on polarization and induces a phase shift of Pi/2 radians between the orthogonally polarized EMR beams, and the induced phase shift is not dependent on the direction in which the beams propagate. For example, a polarization-dependent phase element may take the shape of a quarter-wave plate. In FIG. 5, the polarization marked with (•) is referred to as s-polarization and the polarization marked with (↕) is referred to as p-polarization. The polarization of the EMR beams that propagate along paths 1-4 is a combination of s- and p-polarizations.

Figure 6A:
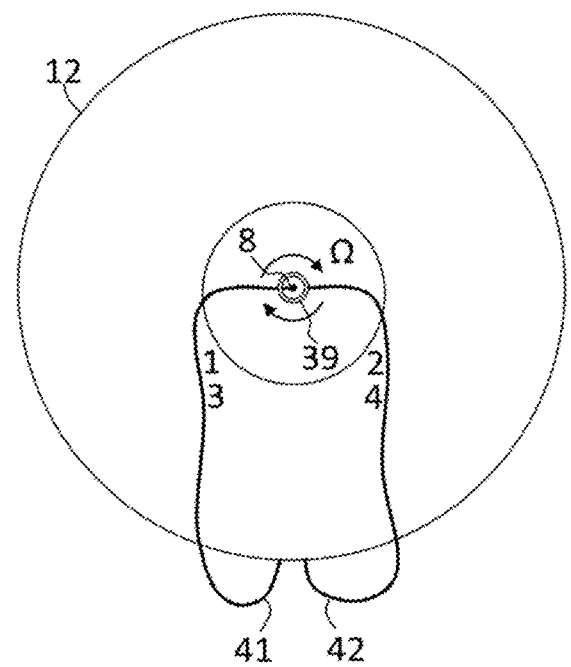
FIG. 6a is a scheme of the proposed device for non-reciprocal transmission of EMR beam with four ports and a fibre ring interferometer (top view)
Figure 6B:
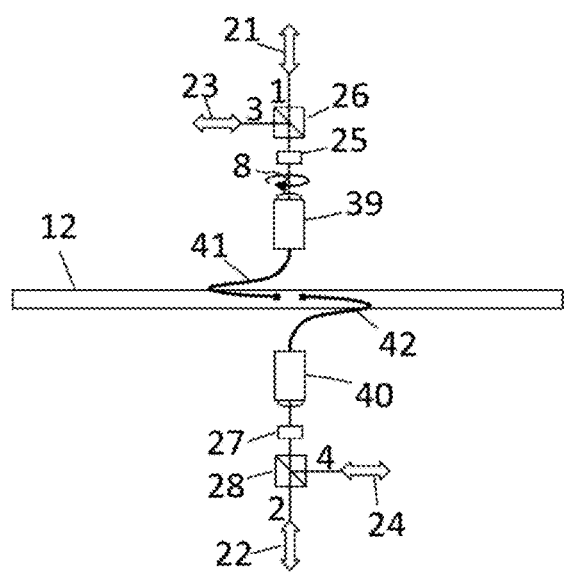
FIG. 6b is a scheme of the proposed device for non-reciprocal transmission of EMR beam with four ports and a fibre ring interferometer (side view)

FIG. 6*a* and FIG. 6*b* shows another device for non-reciprocal transmission of EMR beam wherein the non-reciprocal propagation of EMR beam is ensured inside a fibre ring interferometer 12 rotating at the angular velocity Ω. A scheme of a fibre ring interferometer 12 dependent on polarization is separately presented in FIG. 7. The device includes a circuit connecting the rotating fibre ring interferometer 12 with the four input/output ports 21-24 of the device thus aligning paths 1-4 along which EMR beams propagate with the rotation axis 8 of the ring interferometer 12. The said EMR beam transmission circuit is composed of collimators 39, 40 arranged coaxially along the same axis as the rotation axis 8 of the fibre ring interferometer and two polarization-maintaining fibers 41, 42, connecting the collimators 39, 40 to the fibre ring interferometer 12 and helping to align the input/output paths 1, 3 and 2, 4 along which EMR beams propagate with the rotation axis 8 of the fibre ring interferometer 12. Paths 1 and 3 and paths 2 and 4 along which EMR beams propagate geometrically overlap, but EMR beams travelling along the geometrically overlapping paths are orthogonally polarized. The polarizing beam splitters 26 and 28 which do not rotate together with the ring interferometer 12 are employed to separate the orthogonally polarized EMR beams that propagate in pairs along paths 1, 3 and 2, 4 and to direct them to respective input/output ports 21-24. In order to prevent the rotation of polarization of EMR beams in the rotating fibre ring interferometer 12, means to rotate polarization 25, 27 have been installed with the aim to rotate the polarization of the EMR beams that propagate along the input/output paths 1, 3 and 2, 4 in synchrony with the ring interferometer 12. The device performs the function of a four-port circulator which is dependent on polarization, wherein EMR beam is directed from port 21 to port 22, from port 22 to port 23, from port 23 to port 24, and from port 24 back to port 21. Scheme of a polarizing beam splitter 5 with fibers used as part of the device is shown in FIG. 8.

Figure 7:
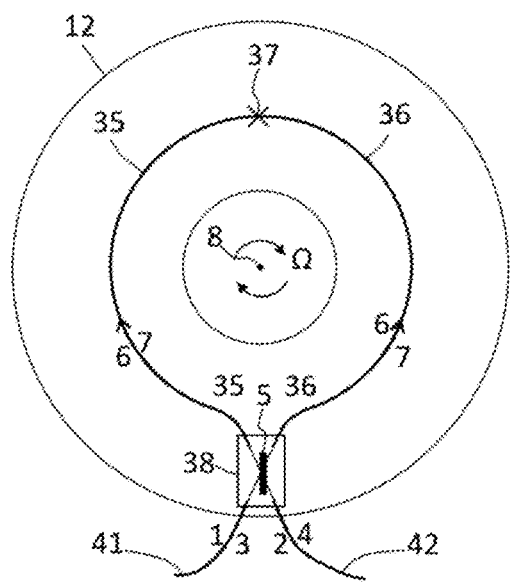
FIG. 7 is a scheme of a rotating fibre ring interferometer.

FIG. 7 shows a scheme of a rotating fibre ring interferometer dependent on polarization. It is similar to the scheme shown in FIG. 5, but is different in that the ring interferometer 12 is made of two polarization-maintaining fibers 35, 36, which are crosswise spliced at one point 37, and the phase element 11 is formed by choosing the length of the fibers 35, 36, which differ in ¼+n/2 polarization beat length, where n is any integer number, between the slow and the fast polarization axis of the fiber.

Figure 8:
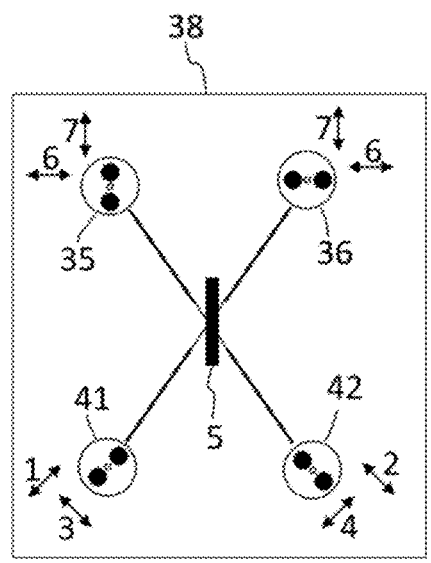
FIG. 8 is a scheme of a polarizing beam splitter with fibers.

FIG. 8 shows a scheme of a polarizing beam splitter with fibers. The ends of the polarization-maintaining fibers 35, 36 composing the ring interferometer are oriented as to make sure that the polarization axes of the fibers matches with the directions of polarization of the EMR beams fed out from the beam splitter 5 and propagating along paths 6 and 7 or, in other words, the fast or slow axes of the fibers 35, 36 overlap with or are perpendicular to the incidence plane of the polarizing beam splitter 5. The polarization axes of the polarization-maintaining fibers 41, 42 are rotated to form a ±45 degree angle with the incidence plane of the polarizing beam splitter 5.

Figure 9:
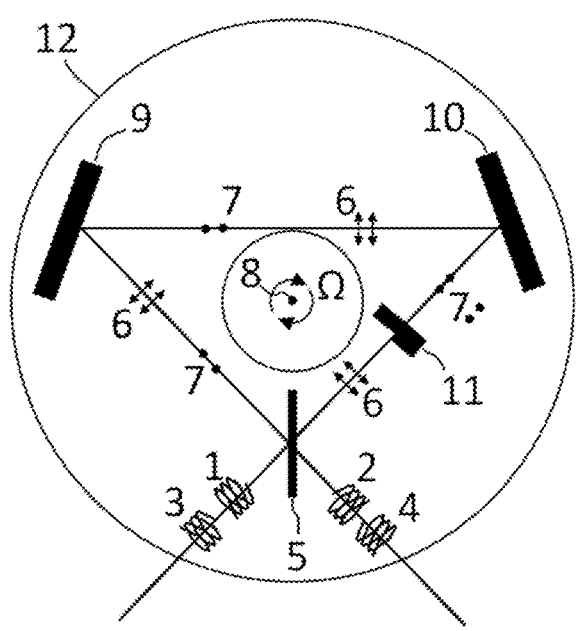
FIG. 9 is a scheme of a rotating ring interferometer dependent on polarization, wherein EMR beams travelling along paths 1-4 are circularly polarized.

FIG. 9 shows a scheme of a rotating ring interferometer 12 dependent on polarization. It is identical to the scheme presented in FIG. 5 but the difference is that here the depicted EMR beams travelling along paths 1 and 3 and paths 2 and 4 are circularly polarized. Circular polarization can help to eliminate the rotation of the polarization orientation together with a rotating interferometer. This property is useful when EMR beams propagate along paths 1-4 between rotating ring interferometer and input/output ports 21-24. In FIG. 9, the circular polarization depicted as a spring rotating in the right or left direction.

Figure 10A:
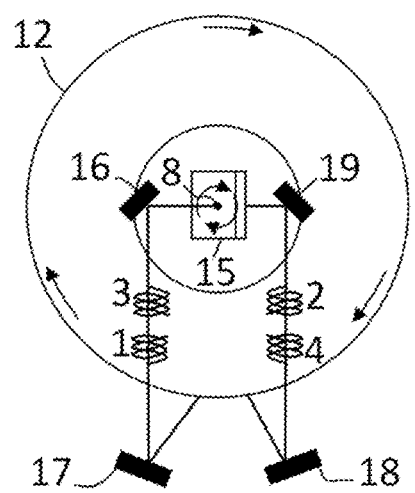
FIG. 10a is a scheme of the proposed device for non-reciprocal transmission of EMR beam with four ports and a rotating ring interferometer dependent on polarization, wherein EMR beams travelling along paths 1-4 are circularly polarized (top view)
Figure 10B:
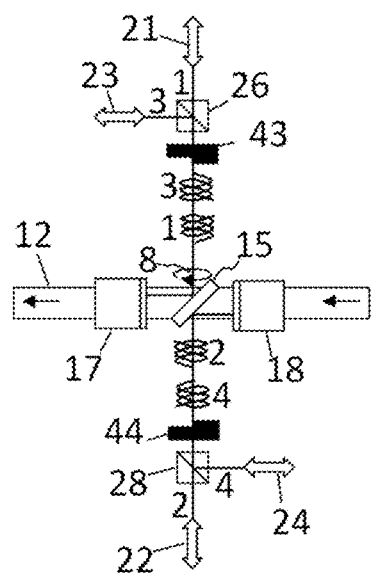
FIG. 10b is a scheme of the proposed device for non-reciprocal transmission of EMR beam with four ports and a rotating ring interferometer dependent on polarization, wherein EMR beams travelling along paths 1-4 are circularly polarized (side view)

FIG. 10*a* and FIG. 10*b* show another device for non-reciprocal transmission of an EMR beam, wherein the non-reciprocal transmission of an EMR beam is ensured inside the ring interferometer 12 which is dependent on polarization and rotates at the angular velocity Ω, and the EMR beams that propagate along paths 1-4 between rotating ring interferometer 12 and input/output ports 21-24 are circularly polarized. The scheme of the ring interferometer 12 dependent on polarization and with circularly polarized EMR beams travelling along input/output paths 1-4 is shown separately in FIG. 9. The device includes a circuit connecting the rotating ring interferometer 12 with four ports 21-24 thus aligning paths 1-4 along which EMR beams propagate with the rotation axis 8 of the ring interferometer 12. The said optical circuit consists of a reflector 15 coaxially arranged along the rotation axis 8 of the ring interferometer 12 and several additional mirrors 16-19 that help align the input/output paths 1, 3 and 2, 4 with the rotation axis 8 of the ring interferometer. The input/output paths 1 and 3 and the input/output paths 2 and 4 geometrically overlap, but the EMR beams that propagate along the said overlapping paths are circularly and orthogonally polarized. The polarizing beam splitters 26 and 28 in combination with quarter-wave plates 43, 44 which do not rotate together with the rotating ring interferometer 12 are employed to change the circular polarization to the linear polarization of the orthogonally polarized EMR beams that propagate in pairs along paths 1, 3 and 2, 4, and are separated to direct them to respective input/output ports 21-24. The device performs the function of a four-port circulator which is dependent on polarization, wherein the EMR beam is directed from port 21 to port 22, from port 22 to port 23, from port 23 to port 24, and from port 24 back to port 21. In FIG. 10, the circular polarization depicted as a spring rotating in the right or left direction.

Figure 11A:
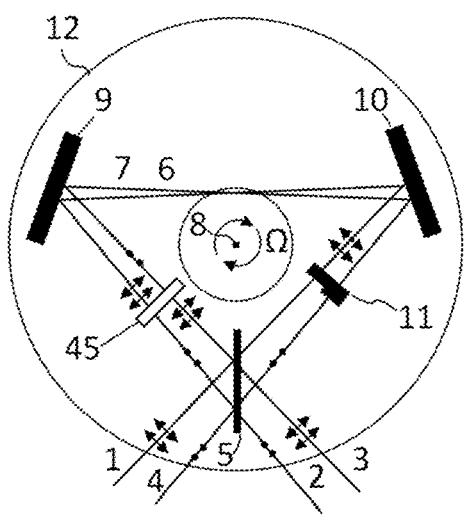
FIG. 11a is a scheme of a rotating ring interferometer independent of polarization, which adapted to use with polarized EMR beams (paths 1, 4 and paths 2, 3 are geometrically separated)
Figure 11B:
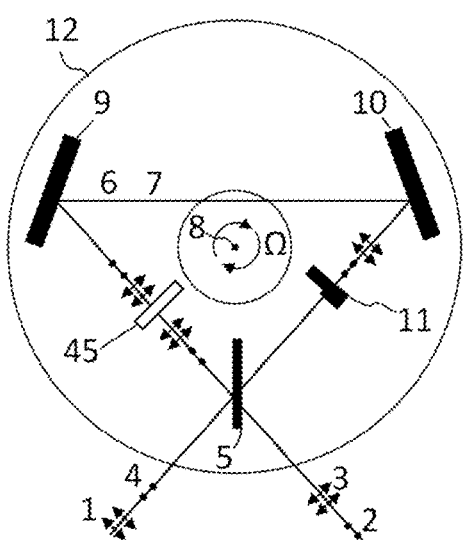
FIG. 11b is a scheme of a rotating ring interferometer independent of polarization, which adapted to use with polarized EMR beams (paths 1, 4 and paths 2, 3 geometrically overlap)

FIG. 11a and FIG. 11b show a scheme of a rotating ring interferometer 12 independent of polarization, but adapted to use with polarized EMR beams. It is similar to the scheme presented in FIG. 4, but it is different in that the ring interferometer 12 additionally contains a mean intended to change the state of polarization to the orthogonal state (45) of the EMR beams which propagate along paths 6 and 7. For this reason, the EMR beams which propagate along paths 1 and 4 and paths 2 and 3 are orthogonally polarized, respectively. Respectively, paths 1 and 4 and paths 2 and 3 of the EMR beams that are fed into and out of the ring interferometer may geometrically overlap too, because the said EMR beams are orthogonally polarized (FIG. 11b). For example, a mean intended to change the state of polarization to the orthogonal state (45) may take the shape of a half-wave plate. In FIG. 11, the polarization marked with (•) is referred to as s-polarization and the polarization marked with (↕) is referred to as p-polarization. The polarization of the EMR beams that propagate along paths 1-4 also can be circularly polarized.

Figure 12A:
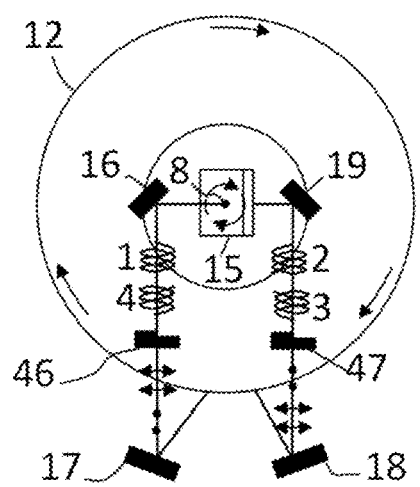
FIG. 12a is a scheme of the proposed device for non-reciprocal transmission of EMR beam with four ports including a rotating ring interferometer independent of polarization which adapted to use with polarized EMR beams (top view)
Figure 12B:
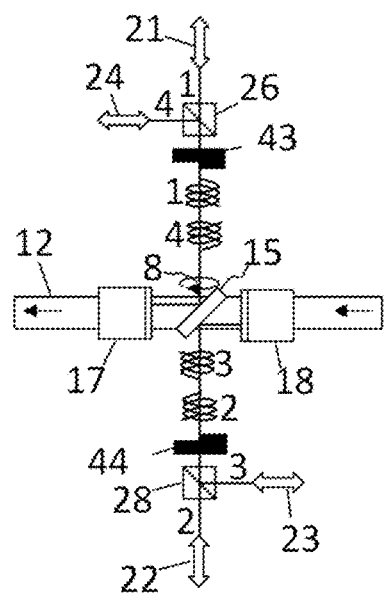
FIG. 12b is a scheme of the proposed device for non-reciprocal transmission of EMR beam with four ports including a rotating ring interferometer independent of polarization which adapted to use with polarized EMR beams (side view)
Figure 13A:
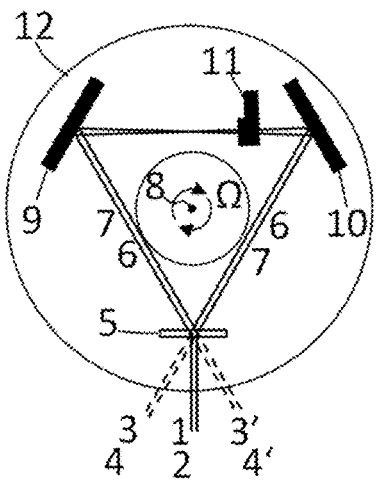
FIG. 13a is a scheme of a rotating ring interferometer independent of polarization with the diffractive beam splitter (EMR beam are not polarized, top view)
Figure 13C:
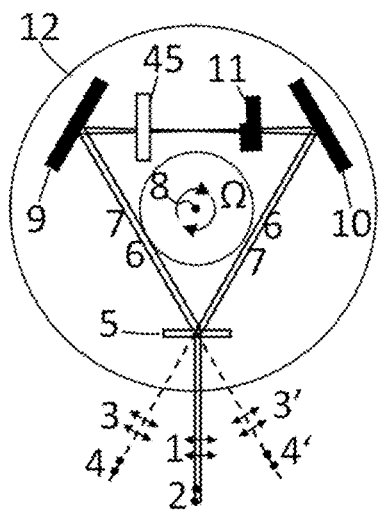
FIG. 13c is a scheme of a rotating ring interferometer independent of polarization with the diffractive beam splitter (adapted to use with polarized EMR beams, top view)
Figure 13B:
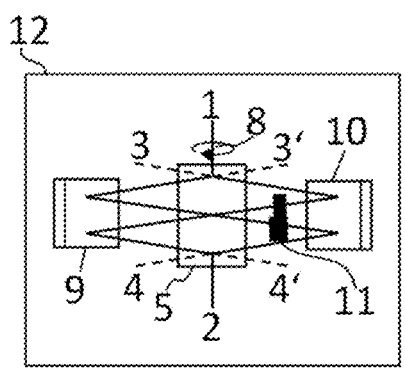
FIG. 13b is a scheme of a rotating ring interferometer independent of polarization with the diffractive beam splitter (EMR beam are not polarized, side view)
Figure 13D:
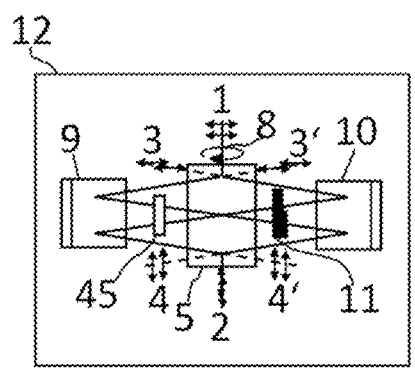
FIG. 13d is a scheme of a rotating ring interferometer independent of polarization with the diffractive beam splitter (adapted to use with polarized EMR beams, side view)

FIG. 12a and FIG. 12b show another device for non-reciprocal transmission of an EMR beam, which is similar to the device shown in FIG. 10a and FIG. 10b, but differs in that the non-reciprocal transmission of an EMR beam is ensured inside the ring interferometer 12 which is independent of polarization, but adapted for use with polarized EMR beams. The scheme of the ring interferometer 12 independent of polarization and adapted for use with the polarized EMR beams is shown separately in FIG. 11b. The device includes a circuit connecting the rotating ring interferometer 12 with four ports 21-24 thus aligning paths 1-4 along which EMR beams propagate with the rotation axis 8 of the ring interferometer 12. The said optical circuit consists of a reflector 15 coaxially arranged along the rotation axis 8 of the ring interferometer 12 and several additional mirrors 16-19 that help align the input/output paths 1, 4 and 2, 3 with the rotation axis 8 of the ring interferometer. The input/output paths 1 and 4 and the input/output paths 2 and 3 geometrically overlap, but the EMR beams that propagate along the said overlapping paths are circularly and orthogo-nally polarized. Linearly polarized EMR beams which propagate along paths 1 and 4 and paths 2 and 3, and rotate together with rotating ring interferometer 12 are transformed to circularly polarized EMR beams with quarter-wave plates 46 and 47, which rotate together with the ring interferom-eter. The quarter-wave plates 43 and 44, which do not rotate together with the rotating ring interferometer 12, together with the polarizing beam splitters 26 and 28 are employed to change the circular polarization to the linear polarization of the orthogonally polarized EMR beams that propagate in pairs along paths 1, 4 and 2, 3, and to direct them to respective input/output ports 21-24. The device performs the function of a four-port circulator which is dependent on polarization, wherein an EMR beam is directed from port 21 to port 22, from port 22 to port 23, from port 23 to port 24, and from port 24 back to port 21. In FIG. 12, the circular polarization depicted as a spring rotating in the right or left direction.

FIG. 13a-FIG. 13d show another schemes of rotating ring interferometers 12 independent of polarization. The schemes are identical to the scheme presented in FIG. 5, but the difference is that the beam splitter 5 is a diffractive beam splitter, which is used to split a single EMR beam into two beams. When counter-propagating EMR beams travelling along paths 6 and 7 inside the rotating ring interferometer 12 acquire a total phase shift of 0+n*Pi radians, where n is any integer number, the EMR beams travelling along paths 6 and 7 with the help of the diffractive beam splitter 5 are combined into a single EMR beam which is fed out of the ring interferometer 12. Otherwise, when the acquired total phase shift is Pi+n*Pi radians, the EMR beams travelling along paths 6 and 7 with the help of the diffractive beam splitter 5 are combined into two EMR beams which are fed out of the ring interferometer 12 and propagate along two paths separated in space. FIG. 13 shows a situation wherein an EMR beam is fed into a rotating ring interferometer through path 1 and is then split into two equally intensive counter-propagating EMR beams by a diffractive beam splitter 5. The phase shift induced by the Sagnac effect and by the phase element 11 results in a total phase shift of 0+n*Pi radians between the counter-propagating EMR beams, and the EMR beams travelling along paths 6 and 7 with the help of the diffractive beam splitter 5 are then combined into a single EMR beam which is fed out of the ring interferometer 12 through path 2. However, if the latter EMR beam is reverted and returned along the same path 2 back to the ring interferometer 12, it is then split with the help of the diffractive beam splitter 5 into two counter-propagating EMR beams, the phase shift induced by the Sagnac effect and by the phase element 11 results in a total phase shift of Pi+n*Pi radians between the counter-propa-gating EMR beams, and the said EMR beams travelling along paths 6 and 7 with the help of the diffractive beam splitter 5 are combined into two EMR beams which are fed out of the ring interferometer 12 and propagate along two paths 3 and 3' separated in space. This scheme of the rotating ring interferometer 12 can also be adapted for use with polarized EMR beams, where the implementation is similar to the scheme shown in the FIG. 11. In this case paths 1 and 2 can geometrically overlap because the EMR beams trav-elling along these paths are orthogonally polarized.

Figure 14A:
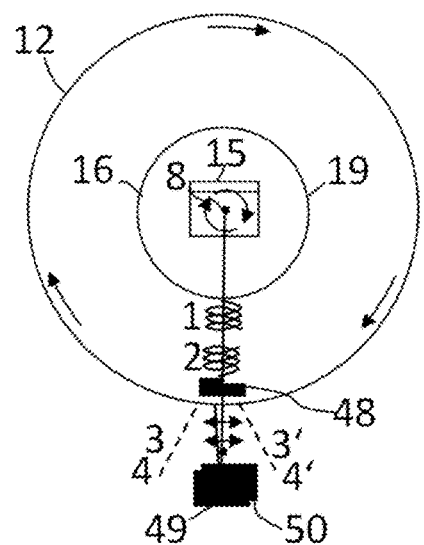
FIG. 14a is a scheme of the proposed device for non-reciprocal transmission of EMR beam with two ports including a rotating ring interferometer independent of polarization with the diffractive beam splitter and adapted to use with polarized EMR beams (top view)
Figure 14B:
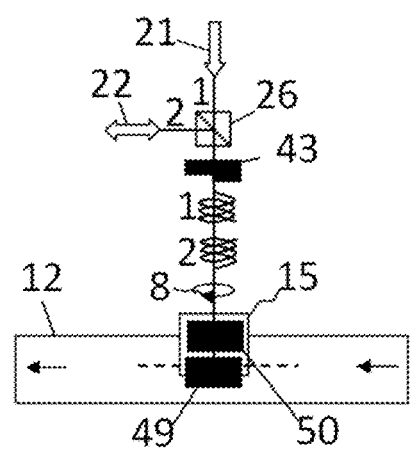
FIG. 14b is a scheme of the proposed device for non-reciprocal transmission of EMR beam with two ports including a rotating ring interferometer independent of polarization with the diffractive beam splitter and adapted to use with polarized EMR beams (side view)

FIG. 14a and FIG. 14b show another device for non-reciprocal transmission of an EMR beam with two input/output ports 21 and 22. The non-reciprocal transmission of an EMR beam is ensured inside the ring interferometer 12 which is independent of polarization with a diffractive beam splitter and adapted for use with polarized EMR beams. The scheme of the ring interferometer 12 is shown separately in FIG. 13c and FIG. 13d. The device includes a circuit connecting the rotating ring interferometer 12 with two ports 21 and 22 thus aligning paths 1 and 2 along which EMR beams propagate along the rotation axis 8 of the ring interferometer 12. The said optical circuit consists of a reflector 15 coaxially arranged along the rotation axis 8 of the ring interferometer 12 and several additional mirrors 49, 50 that help align the input/output paths 1 and 2 with the rotation axis 8 of the ring interferometer. The input/output paths 1 and 2 geometrically overlap, but the EMR beams that propagate along the said overlapping paths are circularly and orthogonally polarized. Linearly polarized EMR beams which propagate along paths 1 and 2, and rotate together with the rotating ring interferometer 12 are transformed to circularly polarized EMR beams with quarter-wave plate 48, which rotates together with the ring interferometer. The quarter-wave plate 43, which does not rotate together with the rotating ring interferometer 12, together with the polarizing beam splitter 26, is employed to change the circular polarization to the linear polarization of the orthogonally polarized EMR beams that propagate in pairs along paths 1, 2, and to direct them to respective input/output ports 21 and 22. The device performs the function of a two-port isolator which is dependent on polarization.

Figure 15A:
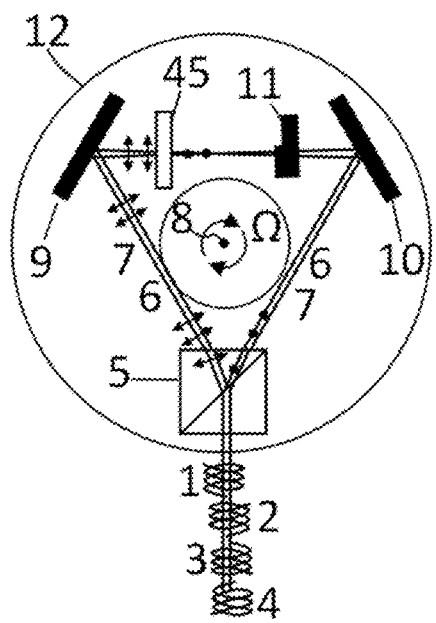
FIG. 15a is a scheme of a rotating ring interferometer dependent on polarization with the birefringent polarizing beam splitter (top view)
Figure 15B:
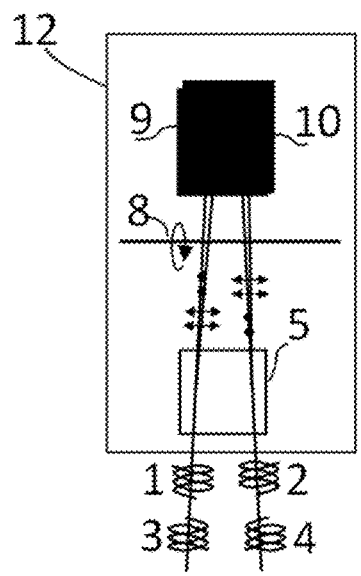
FIG. 15b is a scheme of a rotating ring interferometer dependent on polarization with the birefringent polarizing beam splitter (right-side view)
Figure 15C:
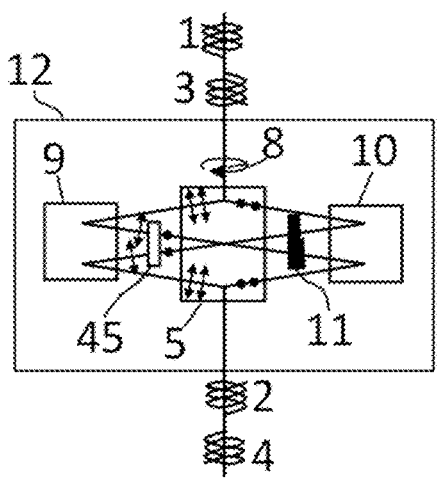
FIG. 15c is a scheme of a rotating ring interferometer dependent on polarization with the birefringent polarizing beam splitter (front-side view)

FIG. 15a-FIG. 15c show another scheme of the rotating ring interferometer 12 dependent on polarization. The scheme of this interferometer is somewhat similar to the other interferometer schemes shown above. The difference is that the beam splitter is a birefringent polarizing beam splitter 5 and the EMR beam can be split into two orthogonally polarized ERM beams and again combined into a single EMR beam only on the same side of the birefringent polarizing beam splitter. For this reason the polarization of counter-propagating EMR beams travelling along paths 6 and 7 inside the rotating ring interferometer 12 must be changed to orthogonal polarization. The means intended to change the state of polarization to orthogonal polarization 45 may take the shape of a half-wave plate. The input/output paths 1 and 3 are geometrically separated from the input/output paths 2 and 4. Geometrical separation of the input/output paths 1 and 3 and input/output paths 2 and 4 is desirable in the plane parallel to the ring interferometer rotation axis 8 in order to avoid any differences in the length of paths 6 and 7. For example, the birefringent polarizing beam splitter 5 can be either the Wollaston prism, Nomarski prism, Glan-Thompson prism, Glan-Foucault prism, Glan-Taylor prism, Nicol prism, Sénarmont prism, Rochon prism, Calcite beam displacers or a birefringent crystal, etc. In FIG. 15, circular polarization is depicted as a spring rotating in the right or left direction. The polarization marked with (•) is referred to as s-polarization and the polarization marked with (↕) is referred to as p-polarization. The polarization of EMR beams which travel along paths 1-4 can be either circular or linear and oriented at 45 degrees respect to the polarization orientation of the ERM beams travelling along paths 6 and 7. Schematically, the way the EMR beam travels can be represented as follows: 1→2→3→4→1, where the arrows indicate the path in which the EMR beam gets directed.

Figure 16A:
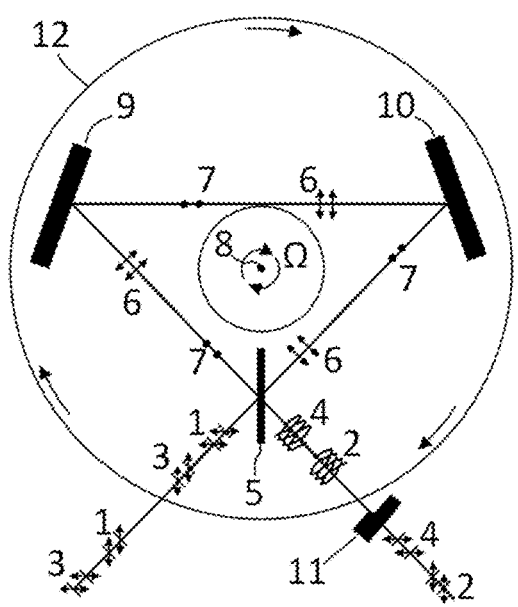
FIG. 16a is a scheme of a rotating ring interferometer dependent on polarization with a phase element placed outside of the rotating ring interferometer (EMR beams travelling between phase element and beam splitter of the rotating ring interferometer are circularly polarized)
Figure 16B:
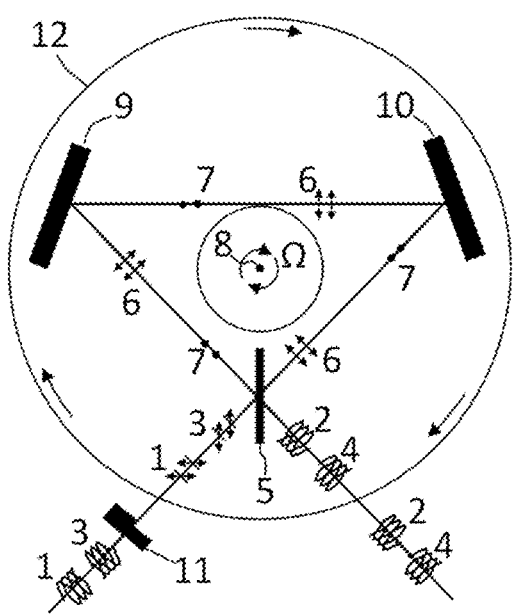
FIG. 16b is a scheme of a rotating ring interferometer dependent on polarization with a phase element placed outside of the rotating ring interferometer (EMR beams travelling between phase element and beam splitter of the rotating ring interferometer are linearly polarized)

FIG. 16a and FIG. 16b show another scheme of the rotating ring interferometer 12 dependent on polarization. It is similar to the scheme presented in FIG. 5, but is different in that the phase element 11 is located outside the ring interferometer 12 and is placed either on input/output paths 2 and 4 or on input/output paths 1 and 3. Phase element 11 is dependent on polarization and induces a phase shift of Pi/2 radians between the orthogonally polarized EMR beams which travel along input/output paths 2 and 4 or input/output paths 1 and 3. An EMR beam can be fed into the rotating ring interferometer 12 and fed out of it through four different paths 1-4 that are interconnected in pairs inside the rotating ring interferometer 12 so that if an EMR beam is fed into the rotating ring interferometer 12 through path 1 or 3, it will be combined into two EMR beams and fed out from the rotating ring interferometer 12 through paths 2 and 4 with a phase shift of ±Pi/2 radians induced by the Sagnac effect. For example, if the phase element 11 is placed on the input/output paths 2 and 4, and an EMR beam is fed into the rotating ring interferometer 12 through path 1, it is split into two EMR beams and fed out from the rotating ring interferometer 12 through paths 2 and 4 with a phase shift of plus Pi/2 radians induced by the Sagnac effect. After passing the phase element 11, the said EMR beams are combined into one EMR beam which propagates along path 2 with the same polarization type as the EMR beam travelling along path 1. However, if the latter EMR beam is reverted and returned along the same path 2 back to the ring interferometer 12, it is then split with the help of the phase element 11 into two EMR beams propagating along paths 2 and 4 with an induced phase difference of Pi/2 radians. The Sagnac effect then results in the phase shift of minus Pi/2 radians which compensates the phase shift induced by the phase element 11. At the output of the rotating ring interferometer EMR beams are combined into one EMR beam which is then directed along path 3 and has the same polarization type as the EMR beam travelling along path 2. For example, the phase element 11 may take the shape of a quarter-wave plate. The superposition of two linearly and orthogonally polarized EMR beams with the phase difference of ±Pi/2 radians is a circularly (right-handed or left-handed) polarized EMR beam and vice versa: the superposition of two circularly and orthogonally polarized EMR beams with the phase difference of ±Pi/2 radians is a linearly polarized EMR beam. Therefore, the phase element 11 combines two orthogonally polarized EMR beams into one EMR beam of the same type of polarization, or the phase element 11 splits a single polarized EMR beam into two orthogonally polarized EMR beams of the same type of polarization. In FIG. 16, the circular polarization depicted as a spring rotating in the right or left direction. The polarization marked with (•) is referred to as s-polarization and the polarization marked with (↕) is referred to as p-polarization.

Figure 17A:
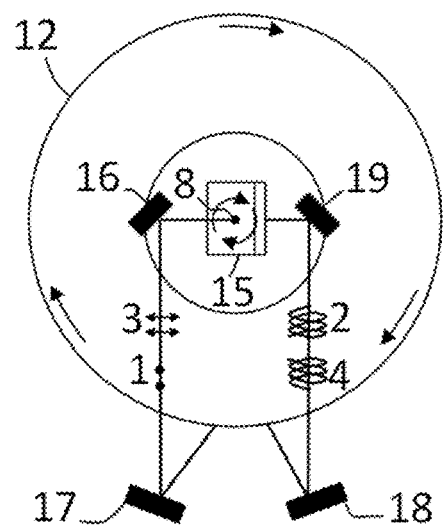
FIG. 17a is a scheme of the proposed device for non-reciprocal transmission of EMR beam with four ports and a rotating ring interferometer dependent on polarization with a phase element placed outside of the rotating ring interferometer (top view)
Figure 17B:
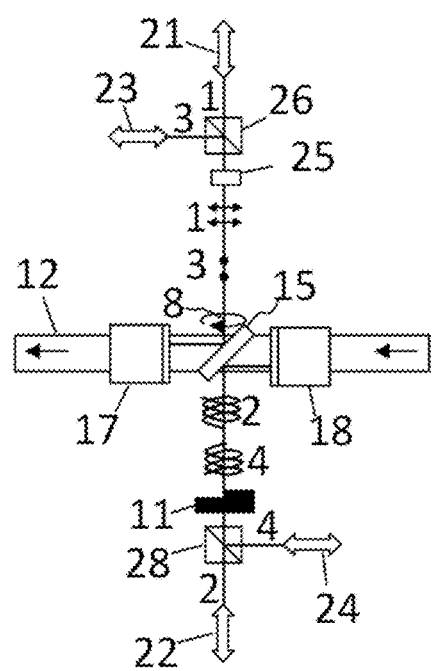
FIG. 17b is a scheme of the proposed device for non-reciprocal transmission of EMR beam with four ports and a rotating ring interferometer dependent on polarization with a phase element placed outside of the rotating ring interferometer (side view)

FIG. 17a and FIG. 17b show another device for a non-reciprocal transmission of an EMR beam, which is similar to the device shown in FIG. 10a and FIG. 10b, but differs in that the phase element 11 inducing a phase shift between orthogonally polarized beams is located on the outside of the interferometer 12. The phase element 11 is placed outside the ring interferometer close to the polarizing beam splitter 28 and does not rotate together with the ring interferometer 12. The phase element 11 together with the polarizing beam splitter 28 is employed to switch between the circular and linear polarization of the orthogonally polarized EMR beams that propagate in pairs along paths 2 and 4 and to direct them to input/output ports 22 and 24 respectively. The scheme of a ring interferometer 12 dependent on polarization where the phase element 11 is located on the outside is shown separately in FIG. 16. The device performs the function of a four-port circulator which is dependent on polarization, wherein an EMR beam is directed from port 21 to port 22, from port 22 to port 23, from port 23 to port 24, and from port 24 back to port 21. In addition, the device can be modified as a semi-circulator by removing the phase element 11 together with the polarization beam splitter 28 from the circuit. Then on each pass through the device the EMR beam changes polarization from linear to circular and vice versa. In FIG. 17, the circular polarization is depicted as a spring rotating in the right or left direction.

Figure 18:
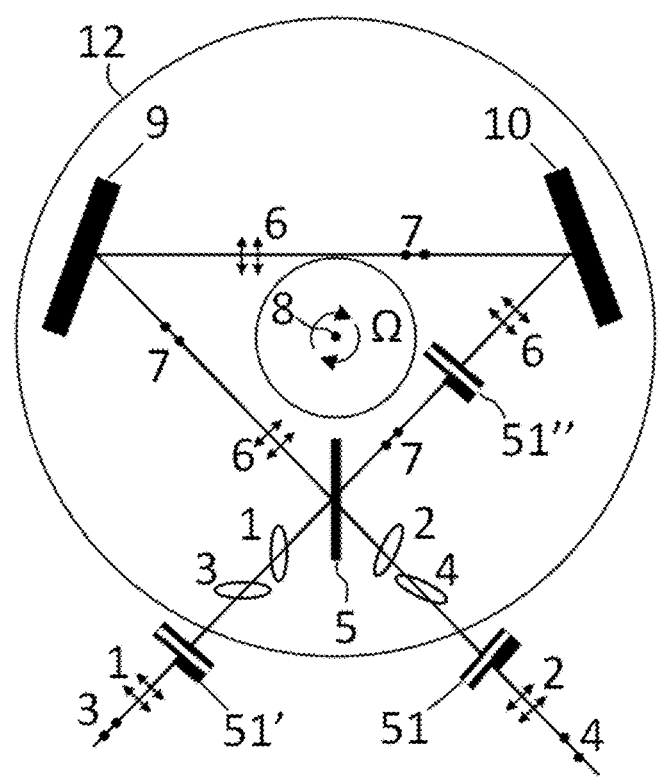
FIG. 18 is a scheme of a rotating ring interferometer dependent on polarization with the three phase elements.

FIG. 18 shows another scheme of the rotating ring interferometer 12 dependent on polarization. It is similar to the schemes presented in FIG. 5 and FIG. 16. The scheme includes at least one of the three phase elements 51, 51' and 51". Phase elements 51 and 51' are located outside the ring interferometer 12 and are placed on input/output paths 2 and 4, and on input/output paths 1 and 3, respectively. The phase element 51" is placed inside the ring interferometer 12. The phase shift induced between orthogonally polarized EMR beams by each phase element can be other than Pi/2 radians. If the scheme contains only one phase element, then this element induces phase a shift of Pi/2 radians. Moreover, a rotating ring interferometer can be used without any phase element if the switching of polarization types between linear and circular is allowed.

Figure 19:
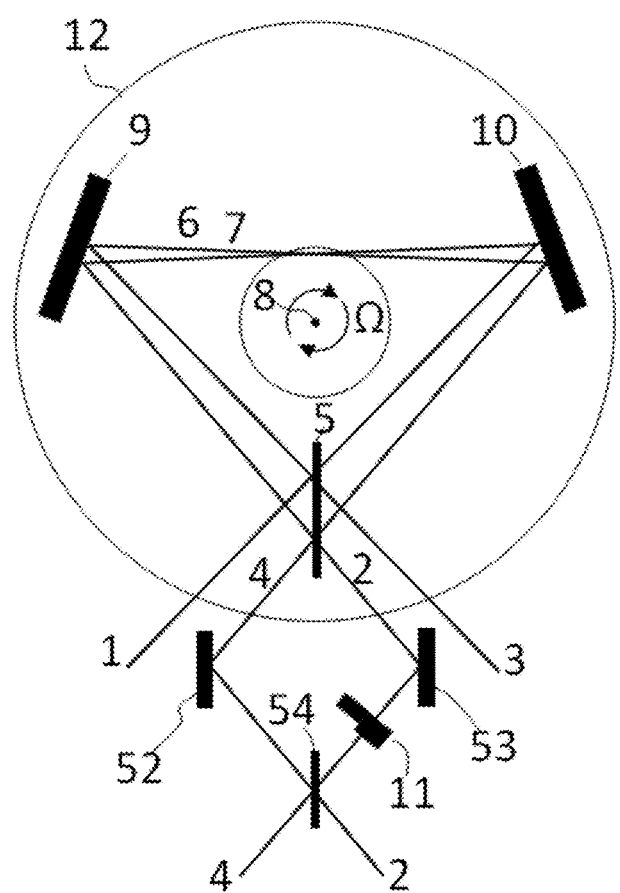
FIG. 19 is a scheme of a rotating ring interferometer independent of polarization with a phase element placed outside of the rotating ring interferometer.

FIG. 19 shows another scheme of the rotating ring interferometer 12 which is independent of polarization. It is similar to the schemes presented in FIG. 4, but is different in that the phase element 11 is located outside the ring interferometer 12 and is placed either on input/output paths 2 and 4 or on input/output paths 1 and 3. The phase element 11 induces a phase shift of Pi/2 radians between the EMR beams which travel along the input/output paths 2 and 4 or input/output paths 1 and 3. Since input/output paths 2 and 4 or input/output paths 1 and 3 are geometrically separated, after inducing a phase shift of Pi/2 radians between the said EMR beams, they are combined into one EMR beam with the help of the beam splitter 54. Additional mirrors 52 and 53 help to combine the EMR beams in the beam splitter.

Figure 20:
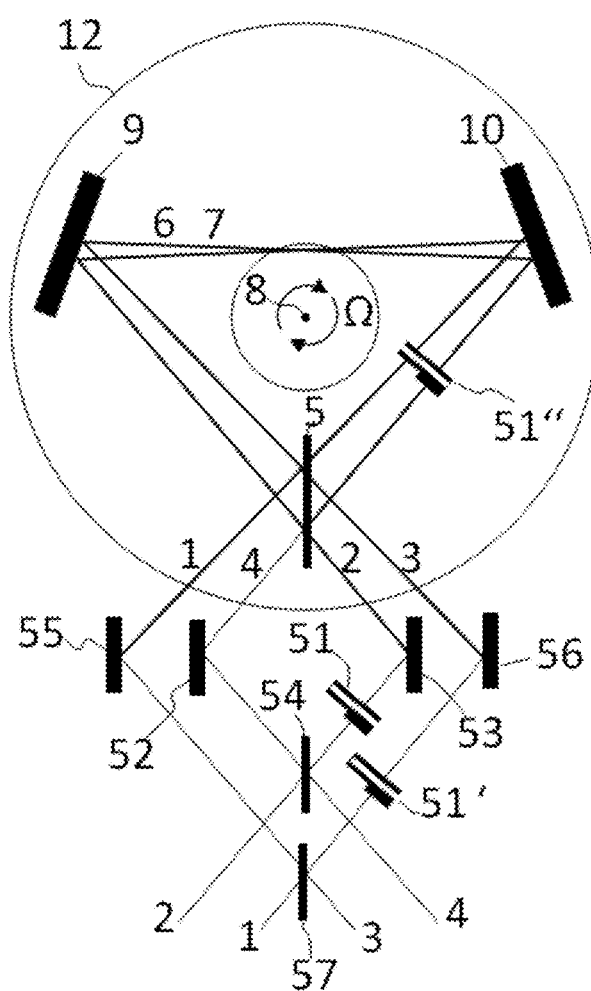
FIG. 20 is a scheme of a rotating ring interferometer independent of polarization with three phase elements.

FIG. 20 shows the extension of the scheme of the rotating ring interferometer 12 which is independent of polarization as presented in FIG. 4. The scheme contains up to three phase elements 51, 51' and 51". Phase elements 51 and 51' are placed outside the ring interferometer 12 on the input/output paths 2 and 4, and on the input/output paths 1 and 3, respectively. The phase element 51" is placed inside the ring interferometer 12. The phase shift induced between orthogonally polarized EMR beams by each phase element can be other than Pi/2 radians. Since input/output paths 2 and 4 or input/output paths 1 and 3 are geometrically separated, the EMR beams are recombined with the help of beam splitters 54 and 57. Additional mirrors 52, 53, 55, 56 help to combine the EMR beams on the beam splitters 54 and 57. If the scheme contains only one phase element, then this element induces a phase shift of Pi/2 radians.

The invention claimed is:

1. A method for non-reciprocal transmission of an electromagnetic radiation (EMR) beam intended to transmit the EMR beam forward and prevent reverse transmission by directing forward and reverse propagating EMR beams along different paths comprising:
   a) inputting the EMR beam through any preselected path of input/output paths (1, 2, 3, 4) into a rotating ring interferometer (12), which rotates at an angular velocity Ω;
   b) splitting the EMR beam inside the rotating ring interferometer (12) into two equally or nearly equally intensive split counter-propagating EMR beams travelling along counter-paths (6), (7) inside the rotating ring interferometer (12) and because of a Sagnac Effect, a phase shift of ±Pi/2+m*Pi radians, where m is any integer number, is induced between two split counter-propagating EMR beams, which may be either positive or negative, with respect to the phase shift m*Pi radians, depending on a direction in which the counter-propagating EMR beams travel along the counter-paths (6), (7) with regard to a rotation direction of the rotating ring interferometer (12);
   c) inducing an additional phase shift of Pi/2+n*Pi radians, where n is any integer number, between the counter-propagating EMR beams inside the rotating ring interferometer (12), which is not dependent on the direction in which the counter-propagating EMR beams propagate and results in a total phase shift of either Pi+(m+n)*Pi radians or 0+(m+n)*Pi radians, between the counter-propagating EMR beams depending on the direction in which the counter-propagating EMR beams travel with regard to the rotation direction of the rotating ring interferometer (12);
   d) combining the counter-propagating EMR beams inside the rotating ring interferometer (12) into a single EMR beam and outputting the single EMR beam from the rotating ring interferometer (12) through different input/output path selected from paths (1, 2, 3, 4) other than a path through which the EMR beam is inputted into the rotating ring interferometer (12); and
   e) aligning at least two input/output paths of EMR beams preselected of the input/output paths (1, 2, 3, 4) with a rotation axis (8) of the rotating ring interferometer (12) and directing to respective input/output ports (21, 22, 23, 24).

2. A method for non-reciprocal transmission of electromagnetic radiation (EMR) beam intended to transmit the EMR beam forward and prevent reverse transmission by directing forward and reverse propagating EMR beams along different paths, comprising:
   a) splitting the EMR beam travelling along any preselected path of input/output paths pair (1, 3) (2, 4) into two equally or nearly equally intensive split EMR beams together with inducing a phase shift of Pi/2+n*Pi radians, where n is any integer number, between the split EMR beam;
   b) inputting the split EMR beams into a rotating ring interferometer (12), which rotates at the angular velocity Ω, and combining into two equally or nearly equally intensive counter-propagating EMR beams travelling along counter-paths (6), (7) inside the rotating ring interferometer (12), and because of a Sagnac Effect, a phase shift of ±Pi/2+m*Pi radians, where m is any integer number, is induced between two counter-propagating EMR beams, which may be either positive or negative, with respect to the phase shift m*Pi radians, depending on a direction in which the counter-propagating EMR beams travel along the counter-paths (6), (7) with regard to a rotation direction of the rotating ring interferometer (12) and results in a total phase shift of either Pi+(m+n)*Pi radians or 0+(m+n)*Pi radians between the counter-propagating EMR beams;
   c) combining of the counter-propagating EMR beams inside the rotating ring interferometer (12) into one single EMR beam and outputting from the rotating ring interferometer (12) through input/output path selected from a different input/output path pair (2, 4) (1, 3) than the input/output path pair through which the EMR beam is inputted into the rotating ring interferometer (12); and
   d) aligning at least one input/output path of the EMR beams preselected of the input/output path pair (1, 3) and at least one input/output path of EMR beams preselected of the different input/output path pair (2, 4) with a rotation axis (8) of the rotating ring interferometer (12) and directing the EMR beams to respective input/output ports (21, 23) (22, 24).

3. A device for non-reciprocal transmission of an electromagnetic radiation (EMR) beam intended to transmit the EMR beam forward and prevent reverse transmission, equipped with at least two input/output ports for inputting the EMR beam into the device and outputting the EMR beam from the device, the device comprising:

a rotating ring interferometer (12) comprising:
  a beam splitter (5) to split the EMR beam inputted into the rotating ring interferometer (12) and combine separated EMR beams into a single EMR beam prior to output from the rotating ring interferometer (12), wherein the beam splitter (5) splits the EMR beam, which is inputted into the rotating ring interferometer (12), into two equally or nearly equally intensive counter-propagating EMR beams, travelling along counter paths (6), (7) inside the rotating ring interferometer (12) and because of a Sagnac Effect, a phase shift of ±Pi/2+m*Pi radians, where m is any integer number, is induced, which may be either positive or negative, with respect to the phase shift m*Pi radians, depending on a direction in which the counter-propagating EMR beams propagate with regard to a rotation direction of the rotating ring interferometer (12), and
  a phase element for inducing an additional phase shift of Pi/2+n*Pi radians, where n is any integer number, between the counter-propagating EMR beams inside the rotating ring interferometer (12), which is not dependent on the direction in which the counter-propagating EMR beams propagate with regard to the rotation direction of the rotating ring interferometer (12) and results in a total phase shift of either Pi+(m+n)*Pi radians or 0+(m+n)*Pi radians between the counter-propagating EMR beams travelling along counter paths (6), (7), which are then directed to the beam splitter (5) and combined into a single EMR beam which is outputted from the rotating ring interferometer (12) through a different input/output path selected from the paths (1, 2, 3, 4) than the input/output path through which the EMR beam is inputted into the rotating ring interferometer (12);
  EMR beam transmission circuit connecting at least two paths preselected of the input/output paths (1, 2, 3, 4) of the EMR beams intended to align the selected paths with a rotation axis (8) of the rotating ring interferometer (12) and to direct the EMR beams to respective input/output ports (21, 22, 23, 24).

4. The device according to claim 3, wherein the rotating ring interferometer (12) comprises a half-wave plate changing a state of polarization to an orthogonal state (45) of the counter-propagating EMR beams travelling along paths (6), (7) inside the rotating ring interferometer (12).

5. The device according to claim 3, wherein the rotating ring interferometer (12) is a fibre ring interferometer and the beam splitter (5) and two polarization-maintaining fibers (35, 36) are crosswise spliced to each other at one point (37) in which a slow and fast axis of the fibers are crossed; the phase element for inducing an additional phase shift is formed by choosing a length of the fibres (35, 36), which differ in ¼+n/2 polarization beat length, where n is any integer number, between the slow and the fast polarization axis of the fibers; and EMR beam transmission circuit connecting the rotating ring interferometer (12) with respective input/output ports (21-24) of the device comprises collimators (39, 40) arranged coaxially with the rotation axis (8) of the rotating interferometer (12) and the collimators (39, 40) are connected to the fibre ring interferometer (12) by polarization-maintaining fibers (41, 42).

6. The device of claim 5, further comprising means (25, 27) for rotating a polarization of the EMR beam to synchronically rotate the polarization of the EMR beam together with the rotating ring interferometer (12) and at a same time maintain an orientation of the polarization of the EMR beam irrespective of a rotation angle of the rotating ring interferometer (12), and polarizing beam splitters (26, 28) to ensure spatial separation of orthogonally polarized EMR beams that propagate along geometrically overlapping paths (1, 4), and to direct the orthogonally polarized EMR beams to separate input and output ports (21-24) of the device.

7. The device according to claim 3, wherein the rotating ring interferometer (12) further comprises an opening formed coaxially with the rotation axis (8) of the rotating ring interferometer (12), wherein the EMR beam propagates through the opening between the input/output ports (21-24) of the device and the rotating ring interferometer (12).

8. The device according to claim 3, wherein the rotating ring interferometer (12) further comprises at least two reflectors (9, 10) arranged inside the rotating ring interferometer (12) on the counter paths (6), (7) of the counter-propagating EMR beams, and the EMR beam transmission circuit connecting the rotating ring interferometer (12) with respective input/output ports (21-24) of the device comprises a reflector (15) arranged coaxially with the rotation axis (8) of the rotating ring interferometer (12) including a plurality of additional mirrors (16-19, 31, 32, 49, 50) in order to align at least two input/output paths (1-4) of the EMR beams with the rotation axis (8) of the rotating ring interferometer (12), wherein the reflector (15) and a plurality of additional mirrors (16-19, 31, 32, 49, 50) are arranged to rotate together with the rotating ring interferometer (12).

9. The device of claim 3, further comprising fiber pigtails connected to any of the input/output ports (21-24) of the device.

10. A device for non-reciprocal transmission of an electromagnetic radiation (EMR) beam intended to transmit the EMR beam forward and prevent reverse transmission, equipped with at least two input/output ports for inputting the EMR beam into the device and outputting the EMR beam from the device, the device comprising:
  a rotating ring interferometer (12) comprising:
    a beam splitter (5) to split the EMR beam or to combine two EMR beams, which are inputted in the rotating ring interferometer (12) into two equally or nearly equally intensive counter-propagating EMR beams, travelling along counter-paths (6) (7) inside the rotating ring interferometer (12) and because of a Sagnac Effect, a phase shift of ±Pi/2+m*Pi radians, where m is any integer number, is induced between two counter-propagating EMR beams, which may be either positive or negative, with respect to the phase shift m*Pi radians, depending on a direction in which the counter-propagating EMR beams propagate with regard to a rotation direction of the rotating ring interferometer (12), and to combine counter-propagating EMR beams into two EMR beams or one EMR beam, which is outputted from the rotating ring interferometer,
    a phase element (11), arranged on a preselected path of input/output paths pair (1, 3) (2, 4), intended for splitting the EMR beam travelling along any preselected path together with inducing the phase shift of Pi/2+n*Pi radians, where n is any integer number, between the EMR beams which are split, which are inputted to the rotating ring interferometer (12) and results in a total phase shift of either Pi+(m+n)*Pi radians or 0+(m+n)*Pi radians between the counter-propagating EMR beams travelling along counter paths (6), (7) and outputted from the rotating ring interferometer (12) through the input/output paths pair selected from a different input/output paths pair (2, 4) (1, 3) than the input/output path pair through which the EMR beam is inputted into the rotating ring interferometer (12);

an EMR beam transmission circuit for connecting and aligning at least one input/output path of EMR beams preselected of input/output paths pair (1,3) and at least one input/output path of EMR beams preselected of another input/output paths pair (2, 4) with a rotation axis (8) of the rotating ring interferometer (12) and directing the EMR beams to respective input/output ports (21, 23) (22, 24).

11. The device according to claim 10, further comprising another beam splitter (54), which in combination with phase element (11) is placed on the preselected path of input/output paths pair (1, 3) (2, 4), intended for splitting the EMR beam travelling along any preselected path together with inducing the phase shift of Pi/2+n*Pi radians, or intended for inducing the phase shift of Pi/2+n*Pi radians between two EMR beams outputted from the rotating ring interferometer (12) combining into a single EMR beam.

12. The device according to claim 10, wherein the rotating ring interferometer (12) further comprises at least two reflectors (9, 10) arranged inside the rotating ring interferometer (12) on the counter paths (6), (7) of the counter-propagating EMR beams, and the EMR beam transmission circuit connecting the rotating ring interferometer (12) with respective input/output ports (21-24) of the device comprises a reflector (15) arranged coaxially with the rotation axis (8) of the rotating ring interferometer (12) including a plurality of additional mirrors (16-19, 31, 32, 49, 50) in order to align at least two input/output paths (1-4) of the EMR beams with the rotation axis (8) of the rotating ring interferometer (12), wherein the reflector (15) and a plurality of additional mirrors (16-19, 31, 32, 49, 50) are arranged to rotate together with the rotating ring interferometer (12).

13. The device according to claim 10, wherein the rotating ring interferometer (12) comprises changing a state of polarization to an orthogonal state (45) of the counter-propagating EMR beams travelling along paths (6), (7) inside the rotating ring interferometer (12), wherein the state of the polarization is changed by a half-wave plate, a liquid-crystal polarization rotator; reflective polarization rotator; or polarizing prism rotator.

14. The device according to claim 10, wherein the rotating ring interferometer (12) further comprises an opening formed coaxially with the rotation axis (8) of the rotating ring interferometer (12), wherein the EMR beam propagates through the opening between the input/output ports (21-24) of the device and the rotating ring interferometer (12).

15. The device of claim 10, further comprising fiber pigtails connected to any of the input/output ports (21-24) of the device.

16. A method for non-reciprocal transmission of electromagnetic radiation (EMR) beam intended to transmit the EMR beam forward and prevent reverse transmission by directing forward and reverse propagating EMR beams along different paths, comprising:

a) inputting the EMR beam travelling along any preselected path of input/output paths pair (1, 3), (2, 4) into a rotating ring interferometer (12), which rotates at an angular velocity $\Omega$, and splitting into two equally or nearly equally intensive counter-propagating EMR beams travelling along counter-paths (6), (7) inside the rotating ring interferometer (12) and because of a Sagnac Effect, a phase shift of $\pm Pi/2+m*Pi$ radians, where m is any integer number, is induced between two counter-propagating EMR beams, which may be either positive or negative, with respect to the phase shift m*Pi radians, depending on a direction in which the counter-propagating EMR beams travel along the counter-paths (6), (7) with regard to a rotation direction of the rotating ring interferometer (12);

b) combining of the counter-propagating EMR beams inside the rotating ring interferometer (12) into two EMR beams and outputting the two EMR beams from the rotating ring interferometer (12);

c) inducing the phase shift of Pi/2+n*Pi radians between the two EMR beams outputted from the rotating ring interferometer (12) resulting in a total phase shift of either Pi+(m+n)*Pi radians or 0+(m+n)*Pi radians between the two EMR beams, and combining the two EMR beams into a single EMR beam and directing the single EMR beam forward along an input/output path selected from a different path pair (2, 4), (1, 3) than the input/output path pair through which the EMR beam is inputted into the rotating ring interferometer (12); and d) aligning at least one input/output path of the EMR beams preselected of an input/output path pair (1, 3) and at least one input/output path of EMR beams preselected of another input/output path pair (2, 4) with a rotation axis (8) of the rotating ring interferometer (12) and directing the EMR beams to respective input/output ports (21, 23) (22, 24).

17. A device for non-reciprocal transmission of electromagnetic radiation (EMR) beam intended to transmit the EMR beam forward and prevent reverse transmission, equipped with at least two input/output ports for inputting the EMR beam into the device and outputting the EMR beam from the device comprising:

a rotating ring interferometer (12) comprising:

a beam splitter (5) to split the one EMR beam or to combine two EMR beams, which are inputted in the rotating ring interferometer (12) into two equally or nearly equally intensive counter-propagating EMR beams, travelling along counter-paths (6), (7) inside the rotating ring interferometer (12) and because of a Sagnac Effect, a phase shift of $\pm Pi/2+m*Pi$ radians, where m is any integer number, is induced between two counter-propagating EMR beams, which may be either positive or negative, with respect to the phase shift m*Pi radians, depending on a direction in which the counter-propagating EMR beams propagate with regard to a rotation direction of the ring interferometer (12), and to combine counter-propagating EMR beams into two EMR beams or one EMR beam, which is outputted from the rotating ring interferometer, a phase element (11) is arranged on the preselected path of input/output paths pair (2, 4) (1, 3), for inducing the phase shift of Pi/2+n*Pi radians between two EMR beams or one EMR beam outputted from the rotating ring interferometer (12), such that a total phase shift of either Pi+(m+n)*Pi radians or 0+(m+n)*Pi radians between the EMR beam(s), together with combining into a single EMR beam and directing forward along input/output path pair selected from a different input/output paths pair (2, 4) (1, 3) than the input/output path pair through which the EMR beam is inputted into the rotating ring interferometer (12); and an EMR beam transmission circuit for connecting and aligning at least one input/output paths pair of EMR beams preselected of an input/output paths pair (1, 3)

and at least one input/output path of EMR beams preselected of a different input/output paths pair (2, 4) with a rotation axis (8) of the rotating ring interferometer (12) and directing the EMR beams to respective input/output ports (21, 23) (22, 24).

18. The device according to claim 17, wherein the rotating ring interferometer (12) further comprises at least two reflectors (9, 10) arranged inside the rotating ring interferometer (12) on the counter paths (6), (7) of the counter-propagating EMR beams, and the EMR beam transmission circuit connecting the rotating ring interferometer (12) with respective input/output ports (21-24) of the device comprises a reflector (15) arranged coaxially with the rotation axis (8) of the rotating ring interferometer (12) including a plurality of additional mirrors (16-19, 31, 32, 49, 50) in order to align at least two input/output paths (1-4) of the EMR beams with the rotation axis (8) of the rotating ring interferometer (12), wherein the reflector (15) and the plurality of additional mirrors (16-19, 31, 32, 49, 50) are arranged to rotate together with the rotating ring interferometer (12).

19. The device according to claim 18, further comprising one or more quarter wave plates (46-48) that rotate together with the rotating ring interferometer (12) and transform a linearly or elliptically polarized EMR beam into a circularly polarized EMR beam that propagates between a rotating part of the device and the input/output ports (21-24) of the device, and one or more other quarter wave plates (43, 44) that do not rotate together with the rotating ring interferometer (12) and are intended to transform the circularly polarized EMR beam on a side of the rotating ring interferometer to the linearly polarized EMR beam on a side of input/output ports (21-24) of the device and polarizing beam splitters (26, 28) in order to ensure a spatial separation of the polarized EMR beams in an orthogonal state that propagate along geometrically overlapping paths (1-4) and to direct the EMR beams to separate input and output ports (21-24) of the device.

20. The device of claim 18, further comprising means (25, 27) for rotating a polarization of the EMR beam to synchronically rotate the polarization of the EMR beam together with the rotating ring interferometer (12) and at a same time maintain an orientation of the polarization of the EMR beam irrespective of a rotation angle of the rotating ring interferometer (12), and polarizing beam splitters (26, 28) to ensure spatial separation of orthogonally polarized EMR beams that propagate along geometrically overlapping paths (1, 4), and to direct the orthogonally polarized EMR beams to separate input and output ports (21-24) of the device.

21. The device according to claim 20, wherein the means (25, 27) to rotate the polarization of the EMR beam is a rotating half-wave plate or liquid-crystal polarization rotator, reflective polarization rotator, or polarizing prism rotator.

22. The device of claim 17, further comprising fiber pigtails connected to any of the input/output ports (21-24) of the device.

23. The device according to claim 17, further comprising another beam splitter (54), which in combination with phase element (11) is placed on the preselected path of input/output paths pair (1, 3), (2, 4), intended for splitting the EMR beam travelling along any preselected path together with inducing the phase shift of Pi/2+n*Pi radians, or intended for inducing the phase shift of Pi/2+n*Pi radians between two EMR beams outputted from the rotating ring interferometer (12) combining into a single EMR beam.

24. The device according to claim 17, wherein the rotating ring interferometer (12) comprises a half wave plate changing a state of polarization to an orthogonal state (45) of the counter-propagating EMR beams travelling along paths (6), (7) inside the rotating ring interferometer (12).

25. The device according to claim 17, wherein the rotating ring interferometer (12) further comprises an opening formed coaxially with the rotation axis (8) of the rotating ring interferometer (12), wherein the EMR beam propagates through the opening between the input/output ports (21-24) of the device and the rotating ring interferometer (12).

* * * * *